United States Patent
Chu et al.

(10) Patent No.: US 10,285,202 B2
(45) Date of Patent: May 7, 2019

(54) CHANNEL ACCESS FOR SIMULTANEOUS UPLINK TRANSMISSIONS BY MULTIPLE COMMUNICATION DEVICES

(71) Applicant: MARVELL WORLD TRADE LTD., St. Michael (BB)

(72) Inventors: Liwen Chu, San Ramon, CA (US); Lei Wang, San Diego, CA (US); Jinjing Jiang, San Jose, CA (US); Yakun Sun, Sunnyvale, CA (US); Hongyuan Zhang, Fremont, CA (US); Hui-Ling Lou, Sunnyvale, CA (US)

(73) Assignee: Marvell World Trade Ltd., St. Michael (BB)

(*) Notice: Subject to any disclaimer, the term of this patent is extended or adjusted under 35 U.S.C. 154(b) by 176 days.

(21) Appl. No.: 15/178,307

(22) Filed: Jun. 9, 2016

(65) Prior Publication Data

US 2016/0366701 A1   Dec. 15, 2016

Related U.S. Application Data

(60) Provisional application No. 62/173,230, filed on Jun. 9, 2015, provisional application No. 62/305,608, filed on Mar. 9, 2016.

(51) Int. Cl.
*H04W 24/10* (2009.01)
*H04W 74/00* (2009.01)
(Continued)

(52) U.S. Cl.
CPC ....... *H04W 74/0816* (2013.01); *H04W 24/10* (2013.01); *H04W 74/002* (2013.01);
(Continued)

(58) Field of Classification Search
CPC . H04W 24/10; H04W 74/00; H04W 74/0816; H04W 74/004; H04W 74/002
See application file for complete search history.

(56) References Cited

U.S. PATENT DOCUMENTS 7,599,332 B2   10/2009   Zelst et al.
7,742,390 B2   6/2010    Mujtaba
(Continued)

FOREIGN PATENT DOCUMENTS

EP   1990955   11/2008
EP   2871901   5/2015
(Continued)

OTHER PUBLICATIONS

International Preliminary Report on Patentability in International Patent Application No. PCT/US2016/036746, dated Dec. 21, 2017 (8 pages).

(Continued)

*Primary Examiner* — Charles C Jiang
*Assistant Examiner* — Kyaw Z Soe

(57) ABSTRACT

A first communication device determines whether the first communication device is to use a first channel access mode or a second channel access mode for accessing a communication channel when the first communication device is triggered for uplink transmission by a second communication device. The first communication device receives a trigger frame from the second communication device. The first communication device transmits, to the second communication device, a data unit triggered by the trigger frame, including using the determined one of the first channel access mode or the second channel access mode to gain access to the communication channel.

20 Claims, 15 Drawing Sheets

(51) Int. Cl.
H04W 74/08 (2009.01)
H04W 84/12 (2009.01)
H04W 88/10 (2009.01)

(52) U.S. Cl.
CPC ...... *H04W 74/004* (2013.01); *H04W 74/0808* (2013.01); *H04W 74/0833* (2013.01); *H04W 84/12* (2013.01); *H04W 88/10* (2013.01)

(56) References Cited

U.S. PATENT DOCUMENTS

| | | | |
|---|---|---|---|
| 8,068,455 | B2 | 11/2011 | Utsunomiya et al. |
| 8,149,811 | B2 | 4/2012 | Nabar et al. |
| 8,155,138 | B2 | 4/2012 | van Nee |
| 8,289,869 | B2 | 10/2012 | Sawai |
| 8,363,578 | B1 | 1/2013 | Ramamurthy et al. |
| 8,526,351 | B2 | 9/2013 | Fischer et al. |
| 8,619,907 | B2 | 12/2013 | Mujtaba et al. |
| 8,670,399 | B2 | 3/2014 | Liu et al. |
| 8,724,720 | B2 | 5/2014 | Srinivasa et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,923,118 | B1 | 12/2014 | Liu et al. |
| 8,971,350 | B1 | 3/2015 | Liu |
| 9,197,298 | B2 | 11/2015 | Kim et al. |
| 2009/0147798 | A1* | 6/2009 | del Prado Pavon .. H04W 74/02 370/461 |
| 2009/0196163 | A1 | 8/2009 | Du |
| 2012/0082147 | A1* | 4/2012 | Liu ......................... H04L 5/001 370/338 |
| 2012/0201213 | A1* | 8/2012 | Banerjea ........... H04W 72/0453 370/329 |
| 2013/0229996 | A1 | 9/2013 | Wang et al. |
| 2015/0131517 | A1 | 5/2015 | Chu et al. |
| 2015/0365940 | A1 | 12/2015 | Chu et al. |
| 2016/0014804 | A1* | 1/2016 | Merlin ................. H04L 5/0044 370/329 |
| 2016/0330714 | A1* | 11/2016 | Hedayat ............ H04W 72/1289 |

FOREIGN PATENT DOCUMENTS

| | | |
|---|---|---|
| WO | WO-2006/054252 | 5/2006 |
| WO | WO-2012/162576 | 11/2012 |
| WO | WO-2015/081179 | 6/2015 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).
IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, The Institute of Electrical and Electronics Engineers, Inc., 2558 pages (Aug. 17, 2012).
IEEE 802.20-PD-06; IEEE p. 802.20TMV14, Draft 802.20 Permanent Document; <System Requirements for IEEE 802.20 Mobile Broadband Wireless Access Systems—Version 14>, 24 pages (Jul. 16, 2004).
Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).
Boyd et al., "Convex Optimization," Cambridge University Press, pp. 1-728 (2004).
Brown, "G.hn: Draft text for G.9960 (2010) corrigendum 1," International Telecommunication Union, pp. 1-184 (Feb. 2011).
Brown, "G.hn: Draft text for G.9961 (2010) corrigendum 1," International Telecommunication Union, pp. 1-282 (Feb. 2011).
Cariou et al., "Multi-channel Transmissions," Doc. No. IEEE 802.11-09/1022r0, *The Institute of Electrical and Electronics Engineers, Inc.*, pp. 1-13 (Sep. 2009).
Chen, "Home Network Basis: Transmission Environments and Wired/Wireless Protocols," Prentice Hall, pp. 1-26 (Jul. 2006).
Chun et al., "Legacy Support on HEW frame structure," doc: IEEE 11-13/1057r0, The Institute of Electrical and Electronics Engineers, Inc., pp. 1-8 (Sep. 2013).
Clausen, "Branch and Bound Algorithms—Principles and Examples," Department of Computer Science, University of Copenhagen, pp. 1-30 (Mar. 12, 1999).
Hiertz et al., "The IEEE 802.11 Universe," IEEE Communications Magazine, pp. 62-70, (Jan. 2010).
Land et al., "An Automatic Method of Solving Discrete Programming Problems," Econometrica, vol. 28, No. 3, pp. 497-520 (Jul. 1960).
Lin et al., "Optimal and Near-Optimal Resource allocation Algorithms for OFDMA Networks," IEEE Transactions on Wireless Communications, vol. 8, No. 8, pp. 4066-4077 (Aug. 2009).
Liu et al., "VHT BSS Channel Selection," *Institute of Electrical and Electronics Engineers, Inc.*, doc. No. IEEE 802.11-11/1433r0, pp. 1-10 (Nov. 2011).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Noh et al., "Channel Selection and Management for 11 ac," Doc. No. IEEE 802.11-10/0593r1, *The Institute of Electrical and Electronics Engineers, Inc.*, pp. 1-21 (May 20, 2010).
Park, "IEEE 802.11ac: Dynamic Bandwidth Channel Access," 2011 IEEE Int'l Conf. on Communications (ICC), pp. 1-5 (Jun. 2011).
Pedersen et al., "Carrier Aggregation for LTE-Advanced: Functionality and Performance Aspects," IEEE Communications Magazine, vol. 49, No. 6, pp. 89-95, (Jun. 1, 2011).

(56) References Cited

OTHER PUBLICATIONS

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Redieteab et al., "Cross-Layer Multichannel Aggregation for Future WLAN Systems," 2010 IEEE Int'l Conf. on Communication Systems (ICCS), pp. 740-756 (Nov. 2010).
Seok et al., "HEW PPDU Format for Supporting MIMO-OFDMA," IEEE 802.11-14/1210r0, 16 pages, (Sep. 14, 2014).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Van Nee et al. "The 802.11 n MIMO-OFDM Standard for Wireless LAN and Beyond," Wireless Personal Communications, vol. 37, pp. 445-453 (Jun. 2006).
Wannstrom, "Carrier Aggregation explained," pp. 1-6 (May 2012).
Yuan et al., "Carrier Aggregation for LTE-Advanced Mobile Communication Systems," *IEEE Communications Magazine*, pp. 88-93 (Feb. 2010).
International Search Report and Written Opinion in International Application No. PCT/US2016/036746, dated Sep. 5, 2016 (12 pages).
Communication pursuant to Article 94(3) received in European Patent Application No. 16732114.0, dated Feb. 18, 2019 (7 pages).

\* cited by examiner

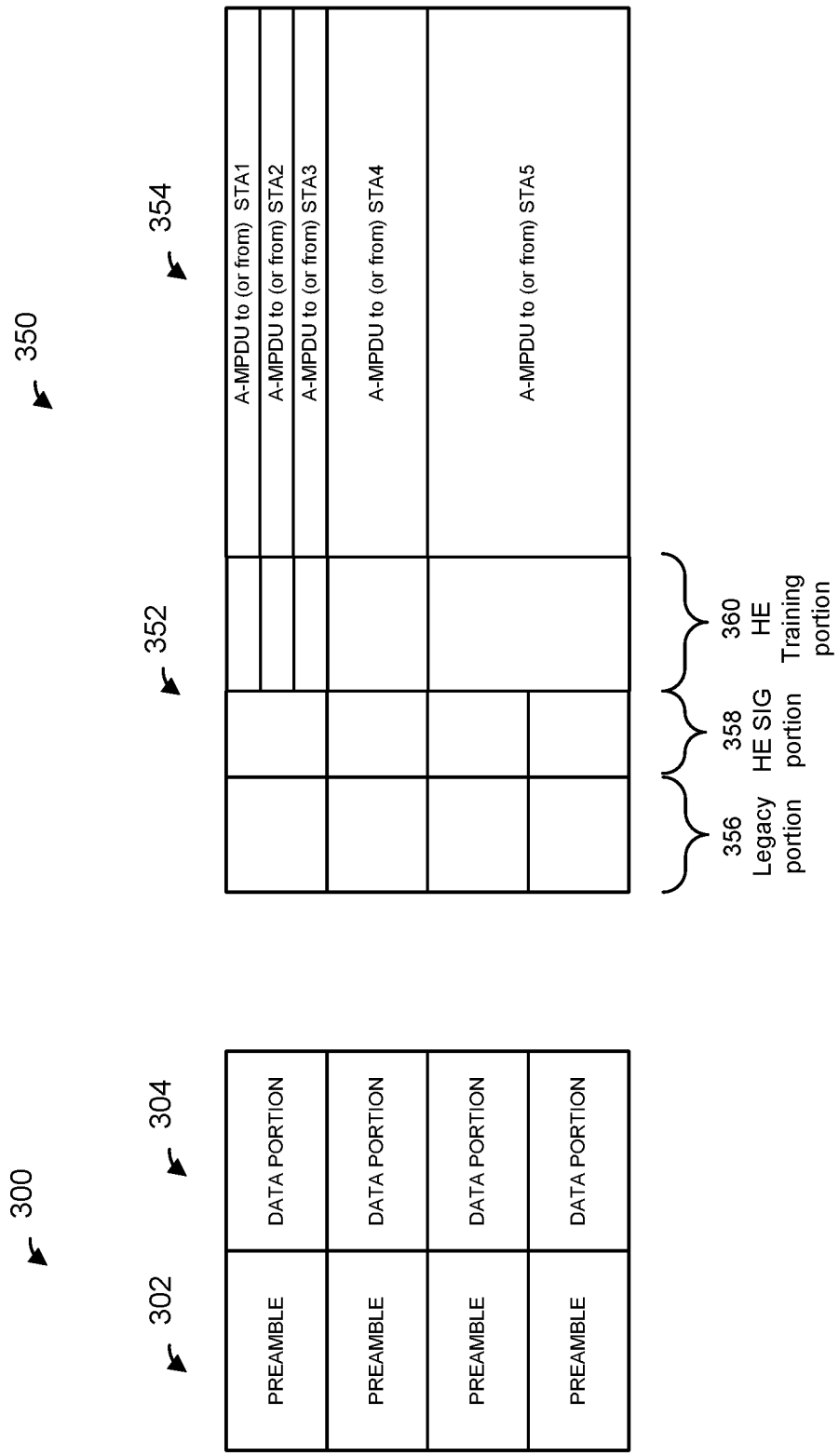

US 10,285,202 B2

CHANNEL ACCESS FOR SIMULTANEOUS UPLINK TRANSMISSIONS BY MULTIPLE COMMUNICATION DEVICES

CROSS-REFERENCES TO RELATED APPLICATIONS

This disclosure claims the benefit of U.S. Provisional Patent Application Nos. 62/173,230, filed Jun. 9, 2015, and 62/305,608, filed Mar. 9, 2016, both entitled "Uplink Multi-User (UL MU) Channel Access," the disclosures of which are hereby expressly incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for communicating in a communication channel of a wireless communication network includes: determining, at a first communication device, whether the first communication device is to use a first channel access mode or a second channel access mode for accessing the communication channel when the first communication device is triggered for uplink transmission by a second communication device; receiving, at the first communication device from the second communication device, a trigger frame; and transmitting, from the first communication device to the second communication device, a data unit triggered by the trigger frame, wherein transmitting the data unit includes using the determined one of the first channel access mode or the second channel access mode to gain access to the communication channel.

In another embodiment, a first communication device comprises a network interface device having one or more integrated circuits. The one or more integrated circuits are configured to: determine whether the first communication device is to use a first channel access mode or a second channel access mode for accessing the communication channel when the first communication device is triggered for uplink transmission by a second communication device, receive a trigger frame from the second communication device, and transmit, to the second communication device, a data unit triggered by the trigger frame, wherein transmitting the data unit includes using the determined one of the first channel access mode or the second channel access mode to gain access to the communication channel.

BRIEF DESCRIPTION OF THE DRAWINGS

FIGS. 3A-3C are block diagrams of example PHY data units, according to some embodiments;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP a client station and uplink direction from a client station to the AP. The first communication protocol also supports one or more multi-user (MU) modes in which the AP transmits multiple independent data streams simultaneously to multiple client stations, or receives independent data streams simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations and/or using orthogonal frequency division multiple access (OFDMA) transmission in which respective frequency sub-channels of a communication channel are used for simultaneous transmission to, or by, respective ones of multiple client stations, in various embodiments.

Figure 1:
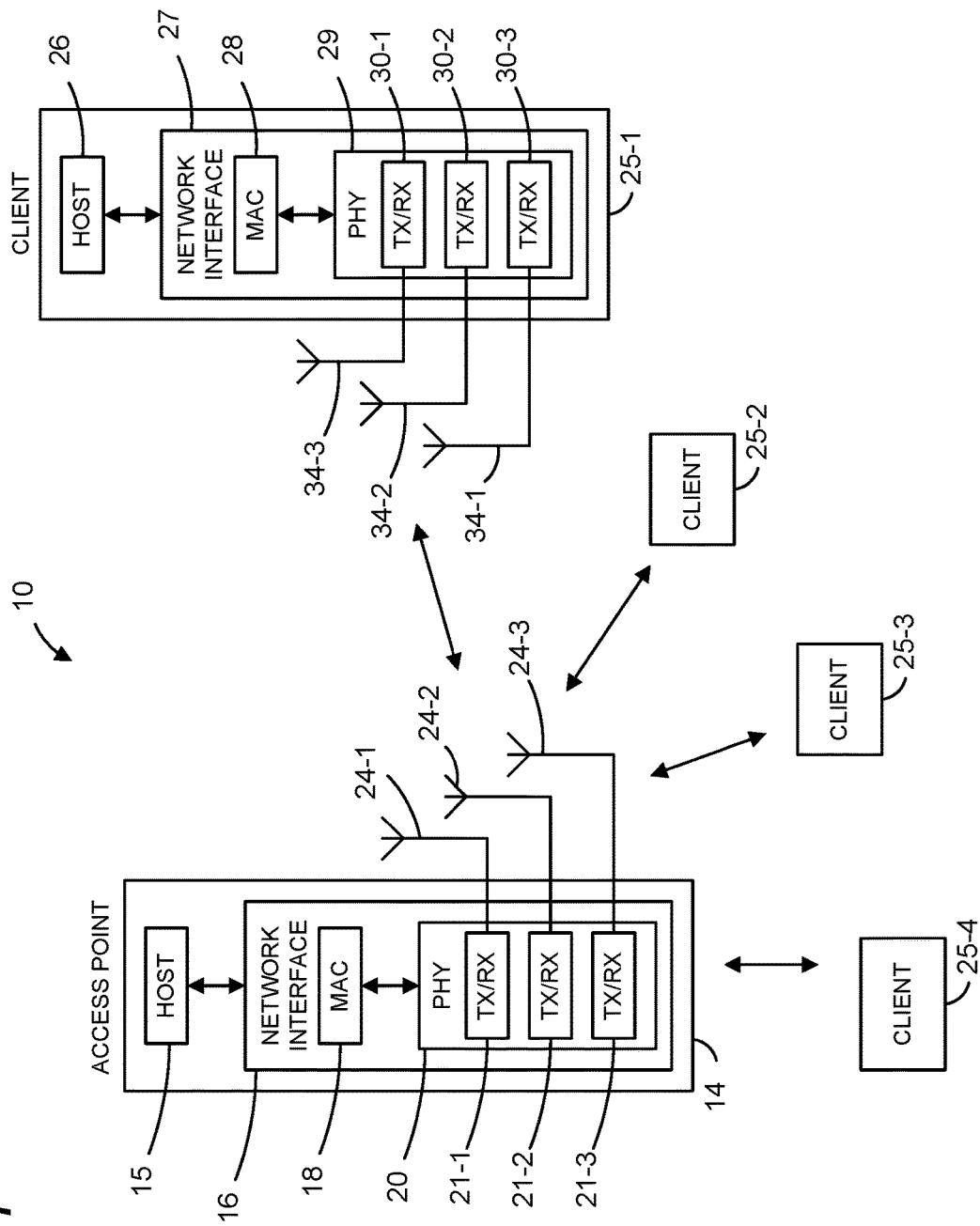
FIG. 1 is a block diagram of an example wireless local area network (WLAN), according to an embodiment.

FIG. 1 is a block diagram of an example wireless local area network (WLAN) 10, according to an embodiment. The WLAN 10 supports downlink (DL) and uplink (UL) multiuser (MU) communication between an access point (AP) and a plurality of client stations. The WLAN 10 includes an AP 14, and the AP 14, in turn, includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In an embodiment, the PHY processor 20 scrambles an MPDU (e.g., a PHY service data unit) based on a scramble seed.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments.

A client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

In an embodiment, one or more of the client stations 25-2, 25-3, and 25-4 has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

In an embodiment, each AP 14 is configured to operate according to a wireless communication protocol that utilizes Orthogonal Frequency Multiple Division Access (OFDMA) technology and/or multi-user multiple input, multiple output (MU-MIMO) technology.

Figure 2:
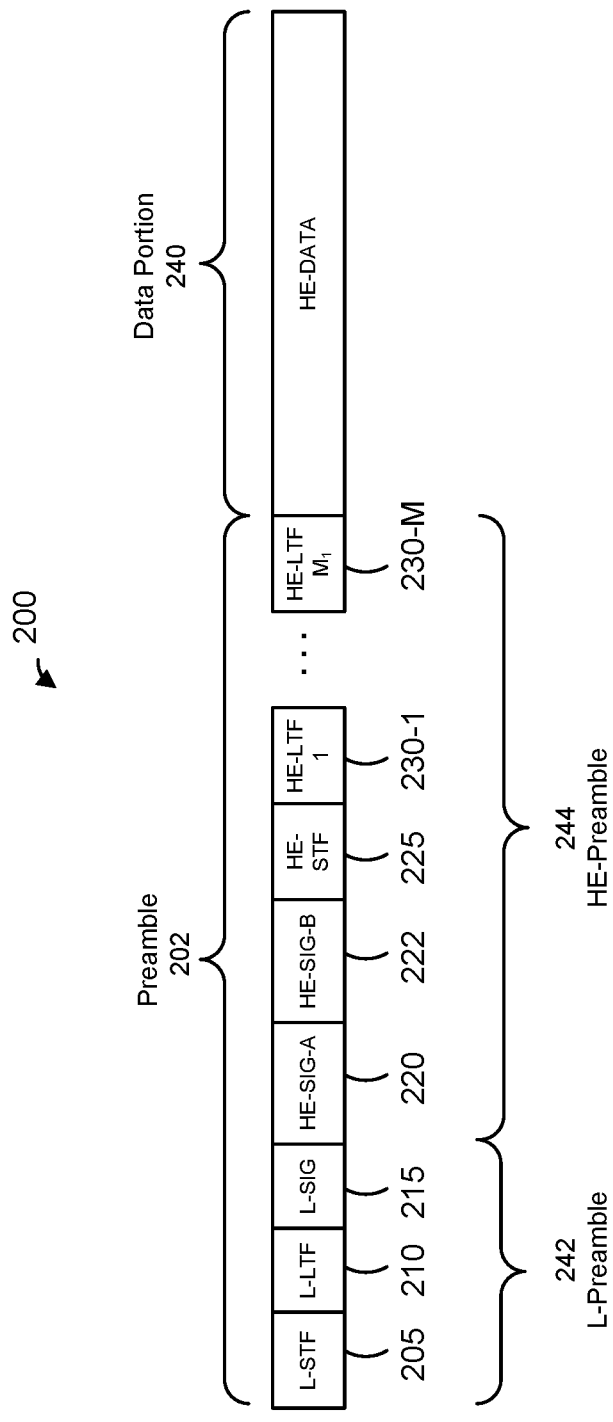
FIG. 2 is a diagrams of a physical layer (PHY) data unit, according an embodiment.

FIG. 2 is a diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, and each allocated resource unit is comprised of one or more K-OFDM tone basic resource units, in an embodiment. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

The data unit 200 includes a preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230. L-STF 205, L-LTF 210 and L-SIG 215 comprise a legacy preamble portion 242 of the preamble 202. The HE-SIG-A 220, the HE-SIG-B 222, the HE-STF 225 and the M HE-LTFs 230 comprise an HE preamble portion 244 of the preamble 202. In some embodiments and/or scenarios, the data unit 200 also includes a data portion 240. In some embodiments and/or scenarios, the data unit 200 omits the data portion 240.

In some embodiments and/or scenarios, the preamble 202 omits one or more of the fields 205-235. For example, the preamble 202 omits the HE-SIG-A 220 and/or the HE-SIG-B 222, in an embodiment. In some embodiments, the preamble 202 includes additional fields not illustrated in FIG. 2.

Each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 is each individually encoded to generate the respective number of OFDM symbols, in an embodiment. As merely an example, in an embodiment, the HE-SIG-A 220 comprises two OFDM symbols, and the HE-SIG-B 222 comprises one OFDM symbol. As merely another example, in another embodiment, the HE-SIG-A 220 comprises one OFDM symbol, and the HE-SIG-B comprises two OFDM symbols. As yet another example, in an embodiment, the HE-SIG-A 220 comprises two OFDM symbols, and the HE-SIG-B 222 comprises a variable number of OFDM symbols. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2, the data unit 200 includes one of each of the L-STF 205, the L-LTF 210, the L-SIG 215, the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, the HE-SIG-A 220 and the HE-SIG-B 222 generally carry information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for receivers that are not intended receivers of the data unit 200, such as information needed for medium protection. On the other hand, HE-SIG-B 222 carries user-specific information individually needed by each intended receiver of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200. In some embodiments and/or scenarios, however, HE-SIG-A field 220 includes information needed to decode the data portion 240, and HE-SIG-B 222 is omitted from the data unit 200 in at least some such embodiments. In at least some embodiments and scenarios in which an AP (e.g., the AP 14) is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 is omitted from the data unit 200.

In some embodiments, specific information included in the HE-SIG-A 220 and/or in the HE-SIG-B 222 depends on the mode of transmission of the data unit 200. For example, in an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figure 3C:
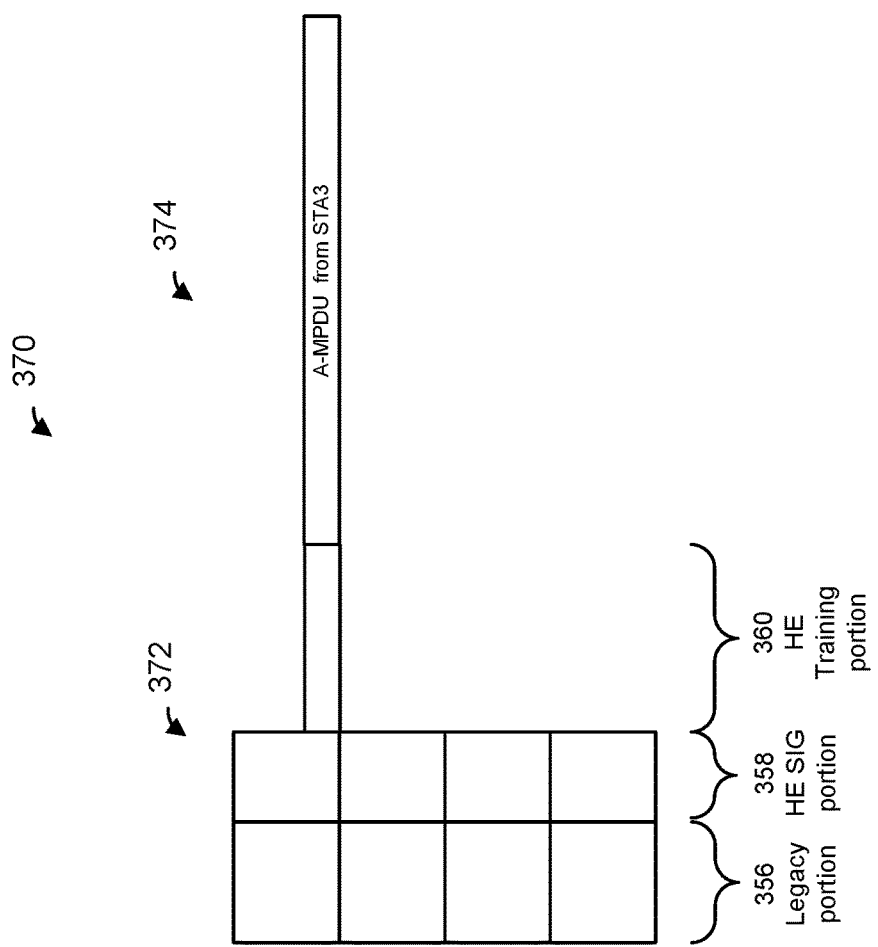

FIGS. 3A-3C are block diagrams of example PHY data units that occupy an 80 MHz bandwidth, according to embodiments. Referring first to FIG. 3A, a data unit 300 is generally similar to the data unit 200 of FIG. 2, in an embodiment. The data unit 300 includes a preamble portion 302 and a data portion 304. In an embodiment, the preamble portion 302 corresponds to a legacy preamble and conforms to a preamble format according to a legacy communication protocol, such as the IEEE 802.11a Standard, the IEEE 802.11n Standard, or the IEEE 802.11ac Standard, for example, in an embodiment. In another embodiment, the preamble 302 corresponds to a non-legacy preamble that conforms to the IEEE 802.11ax Standard, for example. For example, in an embodiment, the preamble portion 302 includes a preamble such as the preamble 202 of FIG. 2. At least some fields in the preamble portion 302 are duplicated in each 20 MHz bandwidth of the data unit 300. For example, the preamble portion 302 includes an L-STF field, an L-LTF field, an L-SIG field, an HE-SIG-A field, an HE-SIG-B field, an HE-STF field and HE-LTF fields such as the L-STF field 205, the L-LTF field 210, the L-SIG field 215, the HE-SIG-A field 220, the HE-SIG-B 222, the HE-STF 225, and HE-LTFs 230, respectively, and each of the L-STF field, the L-LTF field, the L-SIG field and the HE-SIG-A field, the HE-SIG-B field, the HE-STF field, and the HE-LTF fields is duplicated in each 20 MHz bands of the data unit 300, in an embodiment. In an embodiment, at least some fields in the preamble portion 302 are different in different 20 MHz bands of the data unit 300. For example, at least a portion of an HE-SIG-B field, such as the HE-SIG-B field 222, is different (e.g., includes information) in different 20 MHz bands of the data unit 300, in an embodiment.

The data portion 304 of the data unit 300 is duplicated in each 20 MHz band of the data unit 300, in an embodiment, e.g. when the preamble portion 302 is a legacy preamble and is and duplicated in each 20 MHz band. In an embodiment, the data portion 304 includes a trigger frame that triggers uplink OFDMA transmission by a plurality of client stations 25. In an embodiment, the trigger frame includes information that indicates allocation of subchannels to be used for uplink OFDMA transmission, in an embodiment. The trigger frame further indicates other transmission parameters to the multiple client stations 25, such as which modulation and coding scheme (MCS) each of the multiple client stations 25 should use, the OFDM numerology (e.g., guard interval, tone spacing, etc.) that each of the multiple client stations should use, transmit power that each of the multiple client stations 25 should use, etc. In an embodiment, the trigger frame is a duplicate broadcast frame transmitted to the multiple client stations 25 in each 20 MHz band of the data unit 300. In another embodiment, the trigger frame is a broadcast frame that occupies the entire 80 MHz bandwidth of the data unit 300.

Referring now to FIG. 3B, a data unit 350 is generally similar to the data unit 200 of FIG. 2, in an embodiment. The data unit 350 includes a preamble portion 352 and a data portion 354. The preamble portion 352 includes a legacy portion 356, an HE signal field portion 358 and an HE training field portion 360. The legacy portion 356 includes an L-STF field, an L-LTF field and an L-SIG field such as the L-STF field 205, the L-LTF field 210, the L-SIG field 215, respectively, in an embodiment. The HE signal field portion 358 includes one or more HE signal fields such as the HE-SIG-A 220 and/or the HE-SIG-B 222, in an embodiment. The HE signal field portion 358 omits the HE-SIG-B 222, in some situations, in an embodiment. For example, the HE signal field portion 358 omits the HE-SIG-B 222 when the data unit 300 is an uplink data unit, in an embodiment. The HE training field portion 358 includes HE training fields such as the HE-STF 225 and the HE-LTFs 230, in an embodiment.

In an embodiment, the data portion 354 of the data unit 350 includes a plurality of aggregated MAC protocol data units (A-MPDU) respectively directed to ones of multiple client stations 25. In an embodiment, at least some of the A-MPDUs in the data portion 354 occupy subchannels that span a width of less than 20 MHz. For example, A-MPDU to (or from) STA1, A-MPDU to (or from) STA2, and A-MPDU to (or from) STA3 each occupies subchannels that span a width of less than 20 MHz, in an embodiment. In an embodiment, the legacy portion 356 and the HE SIG portion 358 of the preamble 352 spans multiple data units that collectively occupy a 20 MHz bandwidth. On the other hand, the HE training portion 360 of the preamble 352 includes respective training field portions that occupy respective ones of the multiple subchannels in the 20 MHz bandwidths, in an embodiment.

In another embodiment, at least some of the A-MPDUs in the data portion 354 occupy subchannels that span a width of more than 20 MHz. As just an example, an A-MPDU in the data portion 354 occupies a subchannel that spans 40 MHz, in an embodiment. For example A-MPDU to (or from) STA5 in FIG. 3B spans a 40 MHz bandwidth, in an embodiment. In an embodiment, the legacy portion 356 and the HE SIG portion 358 of the preamble 352 is duplicated in each 20 MHz band of the 40 MHz bandwidth. On the other hand, the HE training portion 360 of the preamble 352 spans the entire 40 MHz bandwidth, in an embodiment.

The data unit 350 is a downlink OFDMA data unit transmitted by the AP to a plurality of client stations 25, in an embodiment. In another embodiment, respective A-MPDUs in the data portion 354 are transmitted by multiple client stations 25 as parts of an OFDMA transmission by multiple client stations 25. In an embodiment, an uplink data unit transmitted by a client station 25 includes the legacy preamble portion 354 and the HE signal field portion 356. Additionally, the uplink data unit transmitted by the client station 25 includes a portion of the HE training field portion 260 corresponding to the subchannel allocated for the uplink transmission by the client station 25. Referring briefly to FIG. 3C, an uplink unit 370 is transmitted by STA3, in an embodiment. The uplink data unit 370 includes a preamble 372. The preamble 372 includes the legacy portion 356 and the HE signal portion 358, in an embodiment. The preamble 372 additionally includes a portion of the HE training portion 360 that corresponds to the subchannel allocated to STA3. The data unit 370 further includes a data portion 374. The data portion 374 includes a data unit (e.g., an A-MPDU) in the subchannel allocated to STA3, in an embodiment.

Referring back to FIG. 3B, in an embodiment in which the data unit 350 is a downlink OFDMA transmission to multiple client stations 25, at least some of the A-MPDUs include trigger frames, aggregated with data, to trigger uplink transmission by the client stations 25 to follow transmission of the data unit 350. The trigger frames in the data portion 350 are unicast trigger frames directed to respective ones of the multiple client stations 25, in an embodiment. In an embodiment, a trigger frame transmitted to a particular client station 25 includes information that indicates a subchannel to be used for uplink transmission by the particular client station 25, in an embodiment. In an embodiment, the trigger frame to the particular client station 25 further includes information that indicates other transmission parameters for the particular client station 25, such as which modulation and coding scheme (MCS) the client station should use for uplink transmission, the OFDM numerology (e.g., guard interval, tone spacing, etc.) that the client station should use for uplink transmission, transmit power the client station 25 should use for uplink transmission, etc.

Additionally or alternatively, in an embodiment, the data portion 354 includes a subchannel, sometimes referred to as a control subchannel, allocated for transmission of a broadcast trigger frame directed to multiple client stations 25. In this embodiment, at least some of the client stations 25 that are triggered for uplink OFDMA transmission by the trigger frame in the data unit 350 can be different from client stations 25 to which data is transmitted in the data unit 350.

Figure 4:
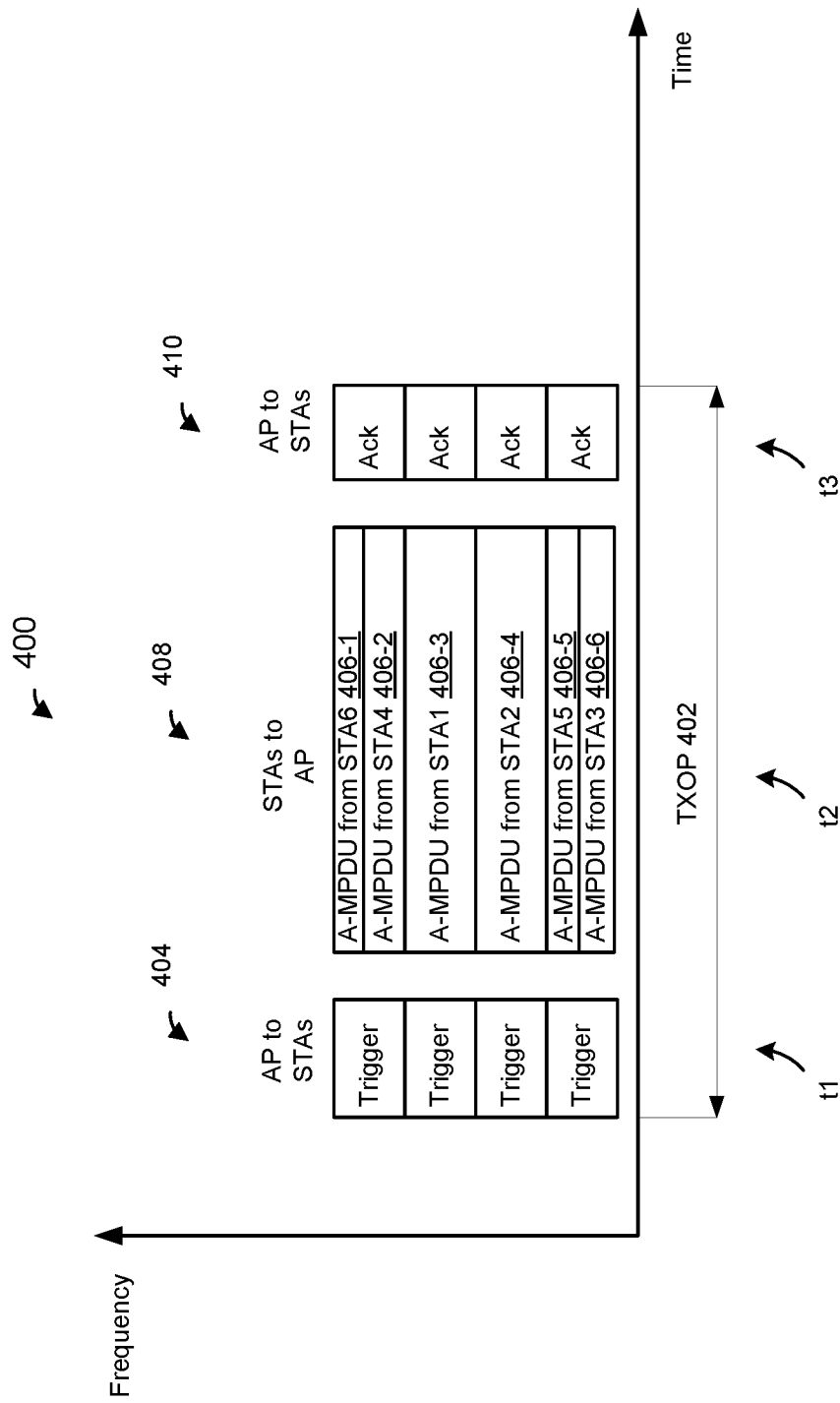
FIG. 4 is a diagram of an example transmission sequence in a WLAN, according to an embodiment.

FIG. 4 is a diagram of an example transmission sequence 400 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 402. During a time t1, the AP 14 transmits a trigger frame 404 to a plurality of client stations 25. In an embodiment, the time t1 begins at the beginning of a TXOP obtained by (e.g., based on a suitable channel assessment procedure, such as a carrier sense multiple access with collision avoidance (CSMA/CA) procedure, a backoff procedure, etc.), or scheduled for, the AP 14. In an embodiment, the trigger frame 404 provides, to the plurality of client stations 25, resource unit allocation indications and other transmission parameters to be used for transmission of an uplink OFDMA data unit during the TXOP 402. In an embodiment, the trigger frame 404 is a MAC control frame that includes the uplink transmission information. In an embodiment, the MAC control frame is included in a data portion a data unit, such as the data portion 304 of the data unit 300 of FIG. 3A. In an embodiment, the trigger frame 404 is included in a physical layer convergence protocol (PLCP) protocol data unit (PPDU), such as a legacy PPDU that conforms to the IEEE 802.11a or IEEE 802.11g Standard, for example. In another embodiment, the trigger frame 404 is a null data packet (NDP) that includes uplink transmission information in a preamble, and omits a data portion. In an embodiment and/or scenario, the trigger frame 404 is duplicated in each channel (e.g., in each 20 MHz channel) of the entire bandwidth of the TXOP 402. In an embodiment in which the trigger frame 404 is included in a legacy PPDU which is duplicated each channel (e.g., in each 20 MHz channel) of the entire bandwidth of the TXOP 402, communication medium is protected from interference by any device in the network over the entire bandwidth of the TXOP 402, at least for the duration defined by a Duration field of the trigger frame 404, or for the duration of the entire TXOP 402. In another embodiment and/or scenario, the trigger frame 404 occupies the entire bandwidth of the TXOP 402, for example when each of the client stations 25 to which the trigger frame 404 is transmitted is capable of operating in the entire bandwidth of the TXOP 402. In an embodiment, a trigger frame that occupies the entire bandwidth of the TXOP 402 is relatively shorter, and accordingly is transmitted in a relatively shorter time period, compared to a trigger frame that is duplicated in each narrowest channel bandwidth of the TXOP 402.

The trigger frame 404 indicates respective subchannels allocated for uplink OFDMA transmission by six client stations STA1 through STA 6, in the illustrated embodiment. During a time t2, client stations STA1 through STA 6 transmit respective OFDM data unit, such as an A-MPDUs, 406 as parts of an OFDMA transmission 408 to the AP 14. In an embodiment, each A-MPDU 406 is included in a physical layer data unit transmitted by a corresponding client station 25. In an embodiment, the OFDMA transmission 408 has a format the same as or similar to the format of the data unit 350 of FIG. 3B. In another embodiment, the OFDMA transmission 408 has a suitable format different from the format of the data unit 350 of FIG. 3B.

Time t2 at each client station 25 begins upon expiration of a predetermined time interval, such as for example a time interval corresponding to a short inter-frame space (SIFS), after completion of reception of the trigger frame 404 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than point coordination function (PCF) interframe space (PIFS) is defined. The greater predetermined time interval may provide sufficient time for the client stations 25 to decode the trigger frame 404 and to prepare for uplink transmission based on the uplink scheduling information provided by the trigger frame 404, in at least some embodiments. Additionally or alternatively, the trigger frame 404 includes one or more padding bits at the end of the trigger frame 404 and before an error detection code field, e.g., a field check sequence (FCS) field, of the trigger frame 404 to provide sufficient time for the client stations 25 to prepare for uplink transmission (which includes performing a clear channel assessment (CCA) procedure) based on the uplink scheduling information provided by the trigger frame 404, in some embodiments. For example, a MAC header included in the trigger frame 404 indicates a length of a valid payload, wherein the one or more padding bits follow the valid payload, in an embodiment. In another embodiment, a specific padding pattern, e.g. a reserved AID value in the rage of 2008 to 2047, can be used for padding where a STA detects the end of a valid payload once the specific pattern is reached. Further, a signal field of a PHY preamble of the trigger frame 404 includes an indication of the entire length of the trigger frame 404, which includes the one or more padding bits at the end of the trigger frame 404 and before an error detection code field, e.g., an FCS field, of the trigger frame 404, in an embodiment. A client station 25 determines based on the length indications which portion of the payload includes padding bits, and stops decoding the payload when it reaches the portion that includes the padding bits, in an embodiment. As such, the one or more padding bits provide "buffer" time that allows the client station 25 to process the trigger frame 404 before trigger frame 404 is entirely received by the client station 25.

In an embodiment, each client station transmits its OFDM data unit 406 during the time t2 in a respective subchannel, allocated to the client station, as indicated in the trigger frame 404. In an embodiment, each client station transmits its OFDM data unit using transmission parameters, such as a modulation and coding scheme, a coding type, transmission power, length or duration of the data unit, etc. indicated in the trigger frame 404. In another embodiment, at least some of the client stations transmit OFDM data unit using at least some transmission parameters, such as a modulation and coding scheme, a coding type, transmission power, length or duration of the data unit, etc. determined by the client stations and not indicated in the trigger frame 404.

During a time t3, the AP 14 transmits respective acknowledgement (ACK) frames 410 to the client stations 25 (STA1 through STA6) acknowledging receipt of the OFDM data units 406 from the client stations 25. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDM data units 406 at the AP 14, in an embodiment. In an embodiment, the AP 14 transmits the ACK frame 410 to the client stations 25, as parts of an OFDMA transmission to the client statins 25, in the respective subchannels allocated to the client stations 25 indicated in the trigger frame 404.

Figure 5:
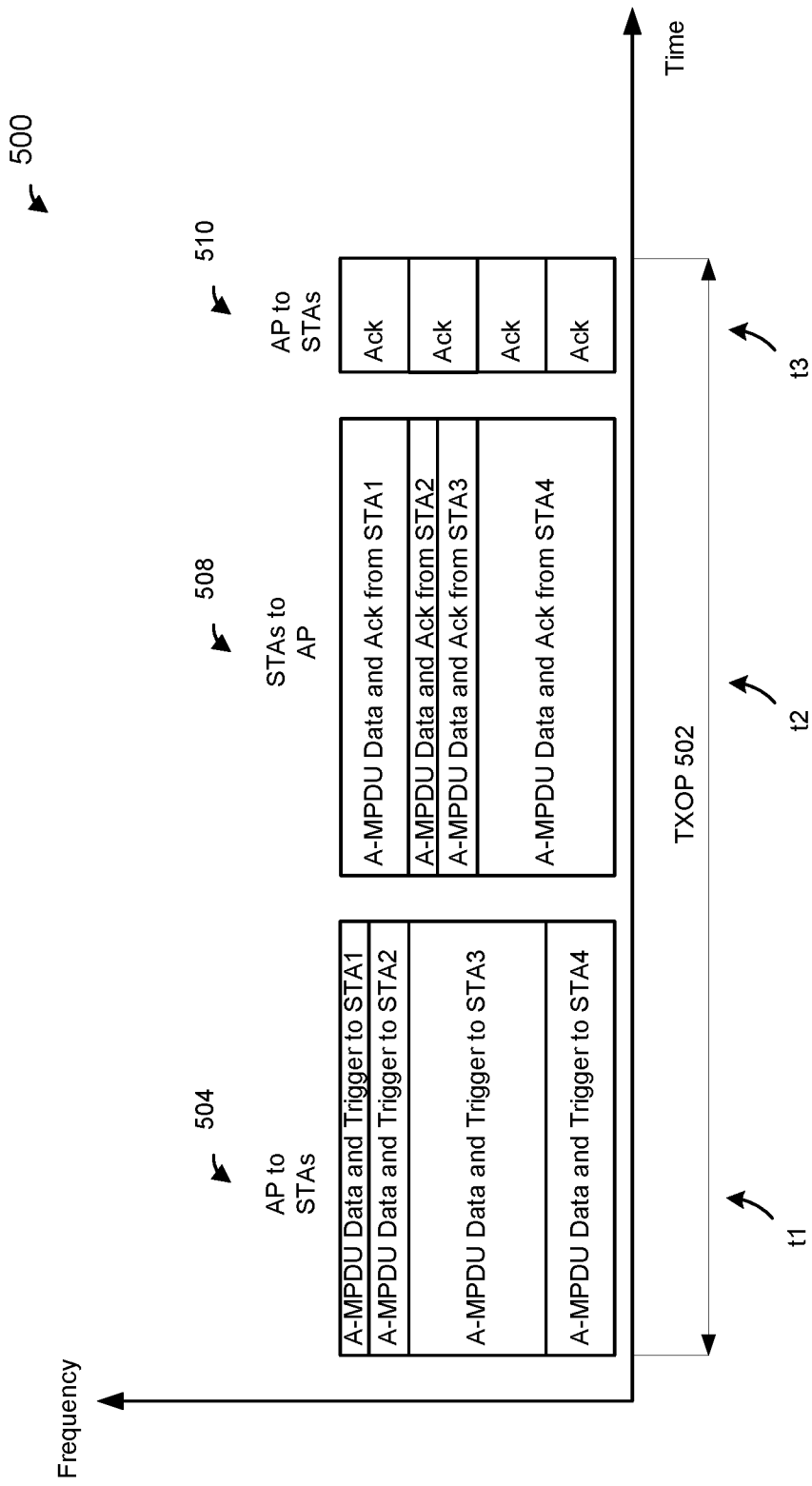
FIG. 5 is a diagram of another example transmission sequence in a WLAN, according to an embodiment.

FIG. 5 is a diagram of an example transmission sequence 500 in a WLAN, such as the WLAN 10 of FIG. 1, according to another embodiment, in which an AP, such as the AP 14, triggers a UL OFDMA transmission by multiple client stations, such as multiple ones of the client stations 25, during a transmission opportunity period (TXOP) 502. The transmission sequence 500 is similar to the transmission sequence 400 of FIG. 4, except that in the transmission sequence 500 a trigger frame is transmitted by the AP 15 to multiple client stations 25 in a same data unit in which the AP 14 transmits data to the multiple client stations 25. In an embodiment.

During a time t1, the AP 14 transmits a downlink OFDMA data unit 504 to a plurality of client stations 25. The downlink OFDMA data unit 504 includes data for multiple client stations 25 and also includes one or more unicast trigger frames to trigger uplink OFDMA transmission by multiple client stations 25. In an embodiment, each of the one or more unicast trigger is transmitted to a particular client station 25, in the downlink OFDMA data unit 504, using the resource unit and/or the spatial streams allocated for downlink transmission to the particular client station 25. In an embodiment, the one or more unicast trigger frames are aggregated with data in the one or more A-MPDUs, in the downlink OFDMA data unit 504, transmitted to the corresponding client stations 25. In another embodiment, the one or more unicast trigger frames are included in respective MAC headers of the one or more A-MPDUs, in the downlink OFDMA data unit 504, transmitted to the corresponding client stations 25.

During a time t2, each client station 25, after receiving the downlink A-MPDU directed to the client station 25, transmits a respective uplink data unit to the AP 14 using trigger information provided to the client station 25 in the unicast trigger frame in the downlink A-MPDU, as part of an uplink OFDMA transmission 508 to the AP 14, in an embodiment. In an embodiment, each uplink A-MPDU includes data from a client station 25 and an acknowledgement frame to acknowledge receipt of the corresponding downlink data unit by the client station 25.

Time t2 at each client station begins upon expiration of a predetermined time interval, such as for example a time interval corresponding to SIFS or another suitable time period, after completion of reception of the corresponding A-MPDU in the data unit 504 by the client station 25, in an embodiment. In another embodiment, a predetermined time period that is greater than SIFS is defined, and time t2 at each client station 25 begins upon expiration of a predetermined time interval corresponding to the predetermined time interval greater than S IFS. For example, a predetermined time period that is greater than SIFS and less than point coordination function (PCF) interframe space (PIFS) is defined. The greater predetermined time interval may provide sufficient time for the client stations 25 to decode the trigger frame included in the data unit 504 and to prepare for uplink transmission based on the uplink scheduling information provided by the trigger frame, in at least some embodiments.

Additionally or alternatively, the data unit 504 includes one or more padding bits at the end of the A-MPDUs included in the data unit 504 to provide sufficient time for the client stations 25 to prepare for uplink transmission based on the uplink scheduling information provided by the trigger frames included in the data unit 504, in some embodiments. For example, a MAC header of a trigger frame included in the data unit 504 indicates a length of a valid payload in the trigger frame, wherein the one or more padding bits follow the valid payload of the trigger frame, in an embodiment. Further, a signal field of a PHY preamble of the data unit 504 includes an indication of the entire length of the data unit 504, which includes the one or more padding bits at the end of the trigger frame (and before an error detection field, if included, in the trigger frame) in the data unit 504, in an embodiment. A client station 25 determines based on the length indications which portion of the payload includes padding bits, and stops decoding the payload of the trigger frame when it reaches the portion that includes the padding bits, in an embodiment. As such, the one or more padding bits provide "buffer" time that allows the client station 25 to process the trigger frame included in the data unit 504 before the data unit 504 is entirely received by the client station 25. In another embodiment, HE PHY padding can be added at the end of the data unit 504 (and before an error detection field, if included). The HE PHY padding at the end of the data unit 504 (and before an error detection field, if included) provides "buffer" time that allows the client station 25 to process the trigger frame included in the data unit 504 before the data unit 504 is entirely received by the client station 25.

During a time t3, the AP 14 transmits respective ACK frames 510 to the client stations 25 (STA1 through STA6) acknowledging receipt of the OFDM data units transmitted by the client stations 25 as parts of the OFDMA transmission 508. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDMA transmission 508 at the AP 14, in an embodiment. In an embodiment, the AP 14 transmits the ACK frames 510 to the client stations 25, as parts of an OFDMA transmission to the client statins 25, in the respective subchannels allocated to the client stations 25 indicated in the trigger frames included in the data unit 504.

In an embodiment, the AP 14 and the client stations 25 contend for communication medium using carrier sense multiple access with collision avoidance (CSMA/CA) protocol or another suitable medium access protocol. In an embodiment, the AP 14 and the client stations implement a clear channel assessment (CCA) procedure, in which the AP/client station determines the energy level of the medium in order to determine whether the medium is busy or idle. If the medium is idle, the device can count down a backoff counter. If the backoff counter reaches a predetermined number (e.g., 0), the device can transmit. If the medium is busy, the device waits until the medium is idle and then counts down the backoff counter while the medium is idle.

In some embodiments, a client station 25 (e.g., the client station 25-1) selectively utilizes a first channel access mode or a second channel access mode for initiating transmission of an UL data unit in response to receiving a trigger frame from the AP 14. In an embodiment, in the first channel access mode, the client station 25-1 initiates transmission of an UL data unit upon expiration of a predetermined time interval, such as SIFS, after reception of the trigger frame, without sensing the medium. The client station 25-1 can transmit its uplink data unit without sensing the medium because the client station 25-1 has sent a clear-to-send (CTS) frame at the beginning of the TXOP and/or the client station 25-1 transmits an ACK or a block acknowledgment (BA) frame, in an embodiment. On the other hand, in the second channel access mode, the client station 25-1 employs a suitable channel sensing technique to ensure that at least the subchannel assigned to the client station 25-1, or a channel (e.g., a 20 MHz channel) that includes the subchannel assigned to the client station 25-1, is idle, and initiates an UL transmission only if the client station 25-1 determines that the at least the subchannel assigned to the client station 25-1 or the channel (e.g., a 20 MHz channel) that includes the subchannel assigned to the client station 25-1 is idle, according various embodiments. For example, the client station 25-1 senses the medium to ensure that that at least the subchannel allocated to the client station 25-1 for uplink transmission is not being used by other communication device, for example by a communication device that is within the communication range of the client station 25-1 but is not within the communication range of the AP 14, such as a communication device that is operating in a basic service set (BSS) serviced by an AP other than AP 14 (e.g., in an overlapping BSS (OBSS)), in some embodiments. The first channel access mode is sometimes referred to herein as a "non-sensing channel access mode," and the second channel access mode is sometimes referred to herein as a "sensing channel access mode."

In some embodiments, the AP 14 determines a channel access mode (e.g., non-sensing channel access mode or sensing channel access mode) should be used by client stations 25 for uplink transmission triggered by a trigger frame received from AP 14. In such embodiments, the AP 14 indicates to the client stations 25 which channel access mode (e.g., sensing channel access mode or non-sensing channel access mode) the client stations 25 should use when transmitting uplink data units triggered by a trigger frame received from the AP 14. For example, a trigger frame transmitted by the AP 14 to a group of client station 25 indicates whether the sensing channel access mode or the non-sensing channel access mode should be used by the group client stations 25 for transmission of uplink data units in response to the trigger frame, in an embodiment. In another embodiment, a trigger frame includes a respective channel access mode indication for each client station 25 being triggered by the trigger frame. In yet another embodiment, the AP 14 includes a channel access mode indication a suitable management frame or control frame, other than a trigger frame, transmitted by the AP 14. The channel access mode indication indicates to a client station 25 whether the sensing channel access technique or the non-sensing channel access technique should be used for uplink transmission triggered by the AP 14, in an embodiment. A client station 25 determines, based on the channel access mode indication in a received management frame or control frame, whether to use the sensing channel access technique or the non-sensing channel access technique for uplink transmissions triggered by the AP 14, in an embodiment.

For example, in an embodiment, the AP 14 includes a channel access mode indication in an association response management frame that the AP 14 transmits to a client station 25 during association establishment with the client station 25. As another example, in an embodiment, the AP 14 includes a channel access mode indication in a probe response management frame, or in another suitable management frame. In another embodiment, the AP 14 includes a channel access mode indication in a beacon frame transmitted by the AP 14. In this embodiment, client stations 25 that receive the beacon frame determine which channel access mode should be used by the client stations 25 based on the channel access mode indication included in the beacon frame. In an embodiment, the client stations 25 utilize the channel access mode determined based on an indication in a beacon frame for a duration of a beacon interval initiated by the beacon frame. In other embodiments, the client stations 25 utilize the channel access mode determined based on an indication in a beacon frame for a duration that is greater than a beacon interval initiated by the beacon frame.

In some embodiments, a client station 25 independently determines a channel access mode (e.g., sensing channel access mode or non-sensing channel access mode) that should be used by the client station 25 for uplink transmission triggered by a trigger frame received from AP 14, without any input from the AP 14. For example, if the client station 25 already sends a CTS frame in a multi-user request-to-send (RTS)/CTS frame exchange scheduled by the AP 14 at the beginning of a TXOP, the client station 25 can ignore the channel sensing requirement in the following trigger frame.

Figure 6:
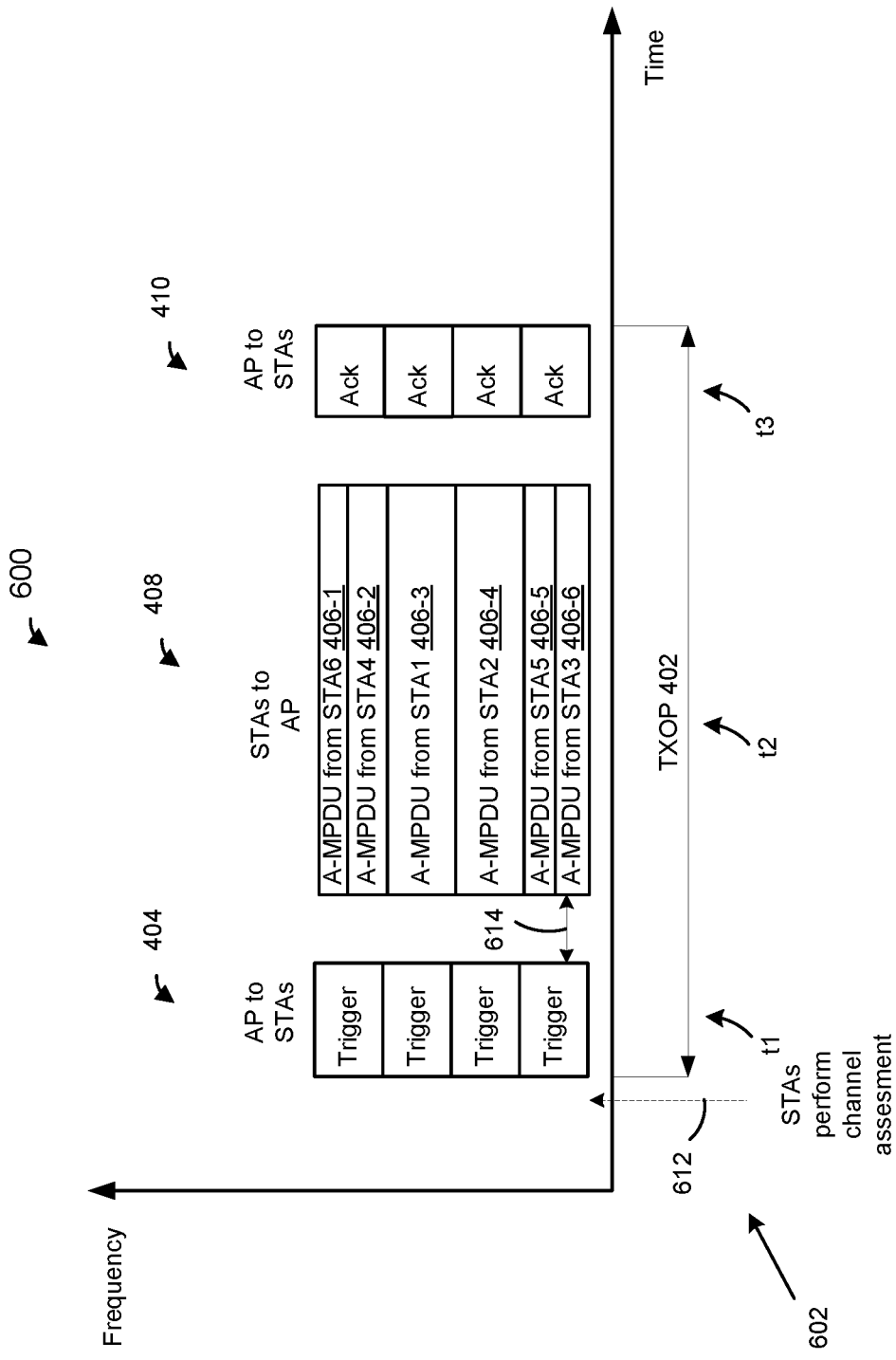
FIG. 6 is a diagram of another example transmission sequence in a WLAN, according to an embodiment.

FIG. 6 is a block diagram of an example transmission sequence 600 in a WLAN, such as the WLAN 10 of FIG. 1, in which a client station utilizes an example channel sensing technique 602 for uplink transmission triggered by an AP, according to an embodiment. In an embodiment, a client station (e.g., the client station 25-1) utilizes the channel sensing technique 602 when the client station 25 is operating in a sensing channel access mode for uplink transmission triggered by the AP 14. The transmission sequence 600 is generally the same as the transmission sequence 400 of FIG. 4, in an embodiment. The transmission sequence 600 includes transmission of the trigger frame 404 by the AP 14 to multiple client stations 25, and transmission of the OFDMA data units 408 by the multiple client stations 25 to the AP 14. In an embodiment, at least some of the client stations 25 of the multiple client stations 25 conduct a channel sensing procedure, such as a CCA procedure, prior to receiving the trigger frame 404, as indicated in FIG. 6 by an arrow 612. When a client station 25 of the multiple client stations 25 receives the trigger frame 404, the client station 25 relies on the CCA procedure performed prior to receiving the trigger frame 404 to determine whether at least the subchannel allocated to the client station 25, as indicated by the trigger frame 404, in available. For example, in an embodiment, the client station 25 generates a channel sensing report based on the channel sensing procedure (e.g., CCA procedure) performed prior to receiving the trigger frame 404. In an embodiment, the channel sensing report includes per-channel information that indicates channel status of each channel (e.g., each 20 MHz channel) of the WLAN 10. For example, the channel sensing report includes, for each of the channels (e.g., each of the 20 MHz channels) of the WLAN 10, an indication that indicates whether the channel was determined to be busy or idle by the channel sensing procedure, in an embodiment. In one embodiment, a per-20 MHz CCA procedure includes i) determining whether detected energy in each 20 MHz channel meets a threshold (e.g., −62 dBm or another suitable threshold) a predetermined time period (e.g., PIFS or another suitable time period) before reception of a trigger frame begins, and ii) virtual carry sensing using a network allocation vector (NAV) timer. In an embodiment, if the NAV timer is 0 and the energy detected in a 20 MHz channel is lower than −62 dBm, the 20 MHz channel is determined to be idle; otherwise the 20 MHz channel is determined to be busy.

In an embodiment, when the client station 25 receives the trigger frame 404 and determines the subchannel allocated for uplink transmission by the client station 25 based on the trigger frame 404, the client station 25 utilizes the channel sensing report generated based on the CCA procedure conducted before receiving the trigger frame 404 to determine whether the channel or channels (e.g., the 20 MHz channel(s)) that include the subchannel allocated for uplink transmission by the client station 25 is/are busy or idle. If the client station 25 determines that the 20 MHz channel(s) that include the subchannel allocated to the client station 25 is/are idle, then the client station 25 transmits, during the time t2, an uplink data unit, in the subchannel allocated to the client station 25, as part of the OFDMA transmission 408. In an embodiment, the uplink data unit transmitted by the client station 25 as part of the OFDMA transmission 408 to the AP 14 is the same as or similar to the uplink data unit 370 of FIG. 3C. In an embodiment, the uplink data unit transmitted by the client station 25 includes a data portion transmitted in the subchannel allocated for uplink transmission by the client station 25. In an embodiment, the client station 25 transmits the uplink data unit upon expiration of a predetermined time interval, such as SIFS or another suitable predetermined time interval, 614 after receiving the trigger frame 404.

Figure 7:
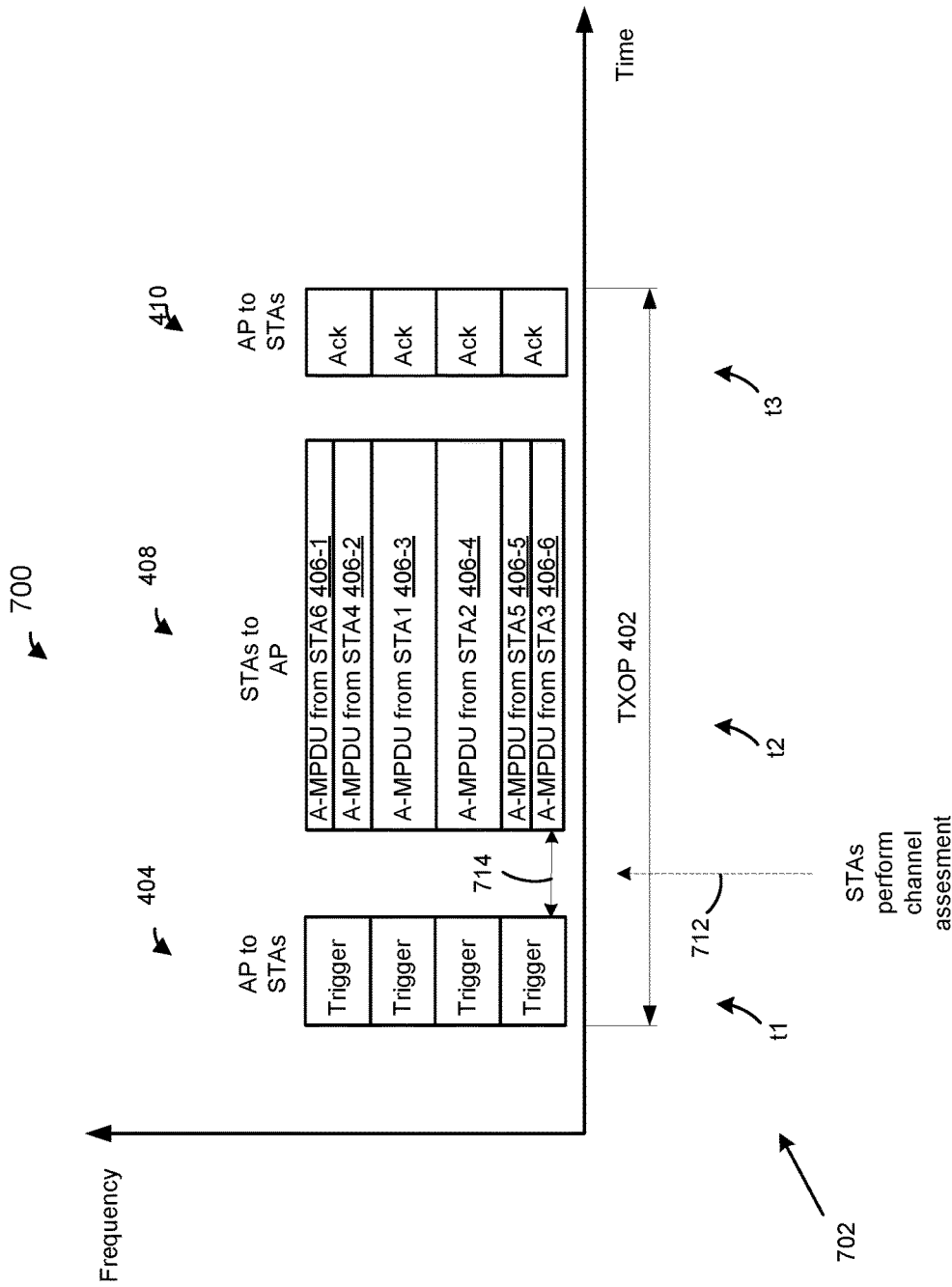
FIG. 7 is a diagram of another example transmission sequence in a WLAN, according to an embodiment.

FIG. 7 is a block diagram of an example transmission sequence 700 in a WLAN, such as the WLAN 10 of FIG. 1, in which a client station utilizes an example channel sensing technique 702 for uplink transmission triggered by an AP, according to an embodiment. In an embodiment, a client station (e.g., the client station 25-1) utilizes the channel sensing technique 702 when the client station 25 is operating in a sensing channel access mode for uplink transmission triggered by the AP 14. The transmission sequence 700 is generally the same as the transmission sequence 400 of FIG. 4, in an embodiment. The transmission sequence 700 includes transmission of the trigger frame 404 by the AP 14 to multiple client stations 25, and transmission of the OFDMA data units 408 by the multiple client stations 25 to the AP 14.

In an embodiment, at least some of the client stations 25 of the multiple client stations 25 conduct a channel sensing procedure, such as a CCA procedure, after receiving the trigger frame 404, as indicated in FIG. 7 by an arrow 712. In an embodiment, the client station 25 determines, based on the trigger frame 404 the subchannel allocated for uplink transmission by the client station 25, and conducts a channel sensing procedure (e.g., CCA) in the subchannel allocated to the client station 25. In one embodiment, a 20 MHz channel(s) CCA sensing procedure includes i) comparing energy detected in the 20 MHz channel to a suitable threshold, and ii) a virtual carry sensing procedure utilizing a NAV timer. In an embodiment, if the NAV timer is 0 and detected energy in the 20 MHz channel is lower than the threshold, the 20 MHz channel is determined to be idle; otherwise the 20 MHz channel is determined to be busy. If the client station 25 determines that subchannel allocated to the client station 25 is idle, then the client station 25 transmits, during the time t2, an uplink data unit, in the subchannel allocated to the client station 25, as part of the OFDMA transmission 408, in this embodiment. In at least some embodiments in which client stations 25 conducts a channel sensing procedure (e.g., CCA) in the respective subchannels allocated to the client station 25, a channel allocation scheme that allows efficient sharing of channel bandwidth among overlapping basic service sets in implemented. For example, in an embodiment, subchannel allocation in the WLAN 10 is performed such that a client station 25 is allocated a subchannel that is not being used by client stations in a BSS that overlaps with the WLAN 10. For example, in an embodiment, the AP 14 cooperates with an AP of a BSS that overlaps with the WLAN 10 to ensure that different client station in the overlapping BSS and the WLAN 10 are assigned different subchannels, in an embodiment.

In another embodiment, the client station 25 determines, based on the trigger frame 404 the subchannel allocated for uplink transmission by the client station 25, and conducts a channel sensing procedure (e.g., CCA) in the channel (or channels) that includes the subchannel allocated to the client station 25. In an embodiment, the client station 25 performs a per-channel CCA procedure, e.g., the client station 25 performs a suitable CCA procedure for each 20 MHz channel corresponding to subchannels allocated to the client station 25 to determine whether each 20 MHz channel is idle. If the client station 25 determines that the 20 MHz channel(s) that include the subchannel allocated to the client station 25 is/are idle, then the client station 25 transmits, during the time t2, an uplink data unit, in the subchannel allocated to the client station 25, as part of the OFDMA transmission 408, in this embodiment. In an embodiment, the uplink data unit transmitted by the client station 25 as part of the OFDMA transmission 408 to the AP 14 is the same as or similar to the uplink data unit 370 of FIG. 3C. In an embodiment, the uplink data unit transmitted by the client station 25 includes a data portion transmitted in the subchannel allocated for uplink transmission by the client station 25. In an embodiment, the client station 25 transmits the uplink data unit upon expiration of a predetermined time interval 714 after receiving the trigger frame 404. The predetermined time interval 714 is a time interval greater than a standard shortest inter-frame time interval such as SIFS, in an embodiment. The predetermined time interval 714 that is greater than SIFS is sufficiently long to allow the client stations 25 to receive and at least partially decode the trigger frame 404, in an embodiment. The predetermined time interval 714 is sufficiently long to allow the client station 25 to determine, based on the trigger frame 404, the respective subchannels allocated to the client stations 25 and to conduct a CCA procedure to determine whether the client stations 25 can transmit in the subchannels allocated to the client stations 25, in an embodiment. In some embodiments, for example if the trigger frame 404 includes padding at the end of the trigger frame 404, the predetermined time interval 714 is the standard shortest inter-frame time interval such as SIFS. In an embodiment, padding at the end of the trigger frame 404 provides sufficient "buffer" time to allow the client station 25 to determine, based on the trigger frame 404, the respective subchannels allocated to the client stations 25 and to conduct a CCA procedure to determine whether the client stations 25 can transmit in the subchannels allocated to the client stations 25 can transmit in the subchannels allocated to the client stations 25.

Figure 8:
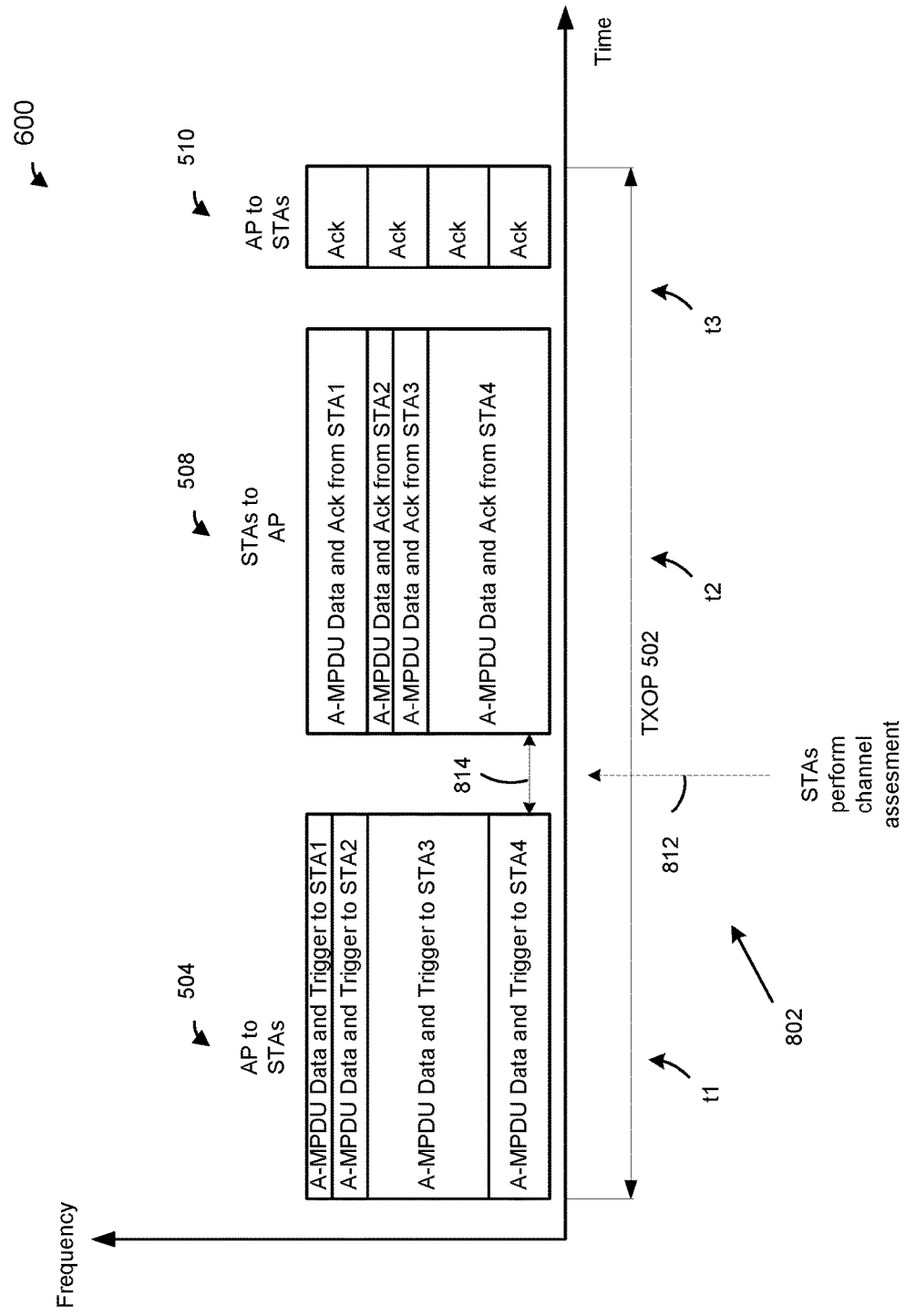
FIG. 8 is a diagram of another example transmission sequence in a WLAN, according to an embodiment.

FIG. 8 is a block diagram of an example transmission sequence 800 in a WLAN, such as the WLAN 10 of FIG. 1, in which a client station utilizes an example channel sensing technique 802 for uplink transmission triggered by an AP, according to an embodiment. In an embodiment, a client station (e.g., the client station 25-1) utilizes the channel sensing technique 802 when the client station 25 is operating in a sensing channel access mode for uplink transmission triggered by the AP 14. The transmission sequence 800 is generally the same as the transmission sequence 500 of FIG. 5, in an embodiment. The transmission sequence 800 includes transmission of the data unit 504 by the AP 14 to multiple client stations 25, the data unit 504 including a trigger frame to trigger transmission of the OFDMA data units 508 by the multiple client stations 25 to the AP 14, in an embodiment.

Client stations 25 using the channel sensing technique 802 conduct a channel sensing procedure, such as a CCA procedure, after receiving trigger frames in the data unit 504, as indicated in FIG. 8 by an arrow 812, in an embodiment. The channel sensing technique 802 is generally the same as the channel sensing technique 702 of FIG. 7, in an embodiment. In various embodiments, a client station 25 determines, based on a trigger frame included in the data unit 504, the subchannel allocated for uplink transmission by the client station 25, and conducts a channel sensing procedure (e.g., CCA) in the subchannel allocated to the client station 25 or in the channel (or channels) that includes the subchannel allocated to the client station 25, as discussed above with respect to the channel sensing technique 702 of FIG. 7. If the client station 25 determines that subchannel allocated to the client station 25 is idle, or the channel or channels that include the subchannel allocated to the client station 25 is/are idle, then the client station 25 transmits, during the time t2, an uplink data unit, in the subchannel allocated to the client station 25, as part of the OFDMA transmission 508, in various embodiments.

In an embodiment, the uplink data unit transmitted by the client station 25 as part of the OFDMA transmission 508 to the AP 14 is the same as or similar to the uplink data unit 370 of FIG. 3C. In an embodiment, the uplink data unit transmitted by the client station 25 includes a data portion transmitted in the subchannel allocated for uplink transmission by the client station 25. In an embodiment, the client station 25 transmits the uplink data unit upon expiration of a predetermined time interval 814 after receiving the data unit 504. The predetermined time interval 814 is a time interval greater than a standard shortest inter-frame rime interval such as SIFS, in an embodiment. The predetermined time interval 814 that is greater than SIFS is sufficiently long to allow the client stations 25 to receive and at least partially decode the trigger frame 404, in an embodiment. The predetermined time interval 814 is sufficiently long to allow the client station 25 to determine, based on the trigger frame 404, the respective subchannels allocated to the client stations 25 and to conduct a CCA procedure to determine whether the client stations 25 can transmit in the subchannels allocated to the client stations 25, in an embodiment. In an embodiment, the predetermined tie interval 814 is the same as the predetermined time interval 714 of FIG. 7.

In some embodiments, for example if the data unit 504 includes padding at the end of the trigger frame 404 (e.g., prior to an error detection field of the trigger frame 404) or if the PHY padding is included at the end of data unit 504 (e.g., prior to an error detection field of the data unit 504), the predetermined time interval 714 is the standard shortest inter-frame time interval such as SIFS. In an embodiment, padding at the end of the data unit 504 provides sufficient "buffer" time to allow the client station 25 to determine, based on the trigger frame included in the data unit 504, the respective subchannels allocated to the client stations 25 and to conduct a CCA procedure to determine whether the client stations 25 can transmit in the subchannels allocated to the client stations 25 can transmit in the subchannels allocated to the client stations 25.

In an embodiment, client stations 25 utilizes either the channel sensing technique 602 of FIG. 6 or the channel sensing technique 702 of FIG. 7 to determine channel availability for uplink transmission triggered by an independently transmitted trigger frame such as the trigger frame 404. For example, the AP 14 informs client stations 25 whether the client stations 25 should use the channel sensing technique 602 of FIG. 6 or the channel sensing technique 702 of FIG. 7 to determine channel availability for uplink transmission triggered by an independently transmitted trigger frame, in an embodiment. In an embodiment, an independently transmitted trigger frame, such as the trigger frame 404, is sufficiently short such that a channel sensing technique, such as the channel sensing technique 602, according to which a client station 25 relies on channel sensing procedure conducted before reception of the trigger frame, is a sufficiently reliable predictor of channel availability after the trigger frame is received by the client station 25. On the other hand, client stations 25 use the sensing technique 802 of FIG. 8 to determine channel availability for uplink transmission triggered by a trigger frame that is included in a downlink transmission that also includes data such as the data unit 504, in an embodiment. In an embodiment, a downlink transmission that includes a trigger frame (or trigger frames) and also includes data, such as the data unit 504, is relatively longer than an independently transmitted trigger frame such as the trigger frame 404. In an embodiment, a channel sensing technique, such as the channel sensing technique 602, according to which a client station 25 relies on channel sensing procedure conducted before reception of the trigger frame, is not a reliable predictor of channel availability after the data unit 504 is received by the client station 25, in at least some scenarios.

In some embodiments, client stations 25 utilize different signal energy level threshold for different bandwidth being sensed by the client station 25. For example, different signal energy thresholds are used for different widths of subchannels that may be allocated to client stations 25, in an embodiment. As another example, different signal energy thresholds are used for different widths of channels that may need to be sensed by the stations 25, in an embodiment. For example, a first signal energy threshold is used for sensing a 20 MHz channel, a second signal energy threshold is used for sensing a 40 MHz channel, a third signal energy threshold is used for sensing an 80 MHz channel, etc., in an embodiment. In an embodiment, the different signal energy levels are defined by the first communication protocol and are implemented by the client stations 25 configured according to the first communication protocol. In another embodiment, the AP 14 indicates the different signal energy levels to the client stations 25. For example, the AP 14 includes indications of different signal energy threshold in a management frame or a control frame transmitted by the AP 14 such as a beacon frame, an association response frame, a probe response frame, or another suitable management or control frame transmitted by the AP 14.

Figure 9:
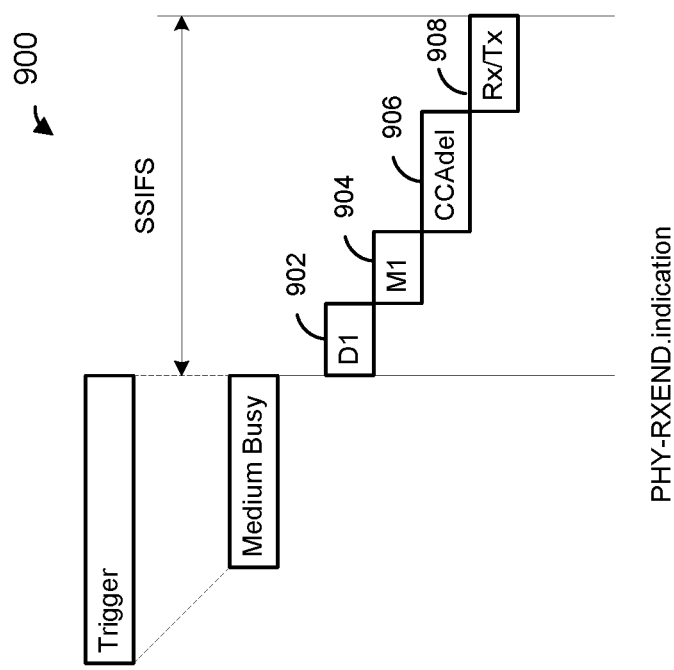
FIG. 9 is a block diagram that illustrates an example interframe space time interval, according to an embodiment.

FIG. 9 is a block diagram that illustrates a time interval 900 used by client stations 25 to conduct a channel sensing procedure after reception of a trigger frame, according to an embodiment. In an embodiment, the time interval 900 corresponds to the time interval 714 of FIG. 7 and/or the time interval 814 of FIG. 8. The time interval 900 corresponds to a sensing short interframe space (SSIFS), in an embodiment. The time interval 900 is longer than SIFS and shorter than PIFS, in an embodiment. The time interval 900 begins at a client station 25 after reception of an independently transmitted trigger frame or of a downlink transmission that includes a trigger frame (or trigger frames) as indicated, for example, by a PHY-RXEND.indication generated by a PHY processor of the client station 25, in an embodiment. The time interval 900 includes a D1 time interval 902, an M1 time interval 904, a CCAdel time interval 906 and an Rx/Tx time interval 908. The D1 time interval 902 and the M1 time interval 904 correspond to a PHY processing delay and a MAC processing delay, respectively, in an embodiment. The CCAdel time interval 906 corresponds to a time interval needed for channel sensing, in an embodiment. CCAdel time interval 906 is equal to (a CCA time interval−D1), in an embodiment. The Rx/Tx time interval 908 corresponds to a transceiver turn-around time, or a time interval needed for switching from transmit mode to receive mode and back to transmit mode, in an embodiment.

In some embodiments in which a longer sensing time interval, such as SSIFS time interval 900, is used between reception of a trigger frame and the uplink OFDMA transmission triggered by the trigger frame, the longer sensing time interval is used by each of the client stations 25 being triggered, regardless of whether or not the client station 25 conducts a channel sensing procedure after receiving the trigger frame. The longer sensing time interval is used by each client station 25 being triggered such that the uplinks transmissions begin at least substantially simultaneously by the client stations 25 being triggered, in an embodiment. Accordingly, in an embodiment, if at least one client station 25 is required to perform conducts a channel sensing procedure after receiving a trigger frame, then each client station 25 utilizes a longer sensing time interval (e.g., SSIFS) as the time interval between reception of the trigger frame and transmission of its uplink data unit being triggered by the trigger frame. On the other hand, if none of the client stations 25 being triggered by a trigger frame are required to conduct channel sensing after receiving the trigger frame, then the client stations 25 utilizes a short time interval, such as SIFS, as the time interval between reception of the trigger frame and transmission of its uplink data unit being triggered by the trigger frame, in an embodiment. In an embodiment, the AP informs client stations 25 whether a shorter time interval (e.g., SIFS) or a longer time interval (e.g., SSIFS) is to be used after receiving a trigger frame. For example, the trigger frame includes an interframe space indication, in an embodiment. The interframe space indication is set to indicate whether client stations 25 being triggered by the trigger frame are to use a longer sensing time interval (e.g., SSIFS) or a shorter time interval (e.g., SIFS) as the time interval between reception of the trigger frame and transmission of its uplink data unit being triggered by the trigger frame, in an embodiment.

In another embodiment, a longer time interval (e.g., SSIFS) is used by the client stations 25 as the time interval between reception of the trigger frame and transmission of uplink data units being triggered by the trigger frame in all scenarios. In this embodiment, no signaling is needed to inform client stations whether a shorter time interval or a longer time interval is to bed used after receiving a trigger frame.

Figure 10:
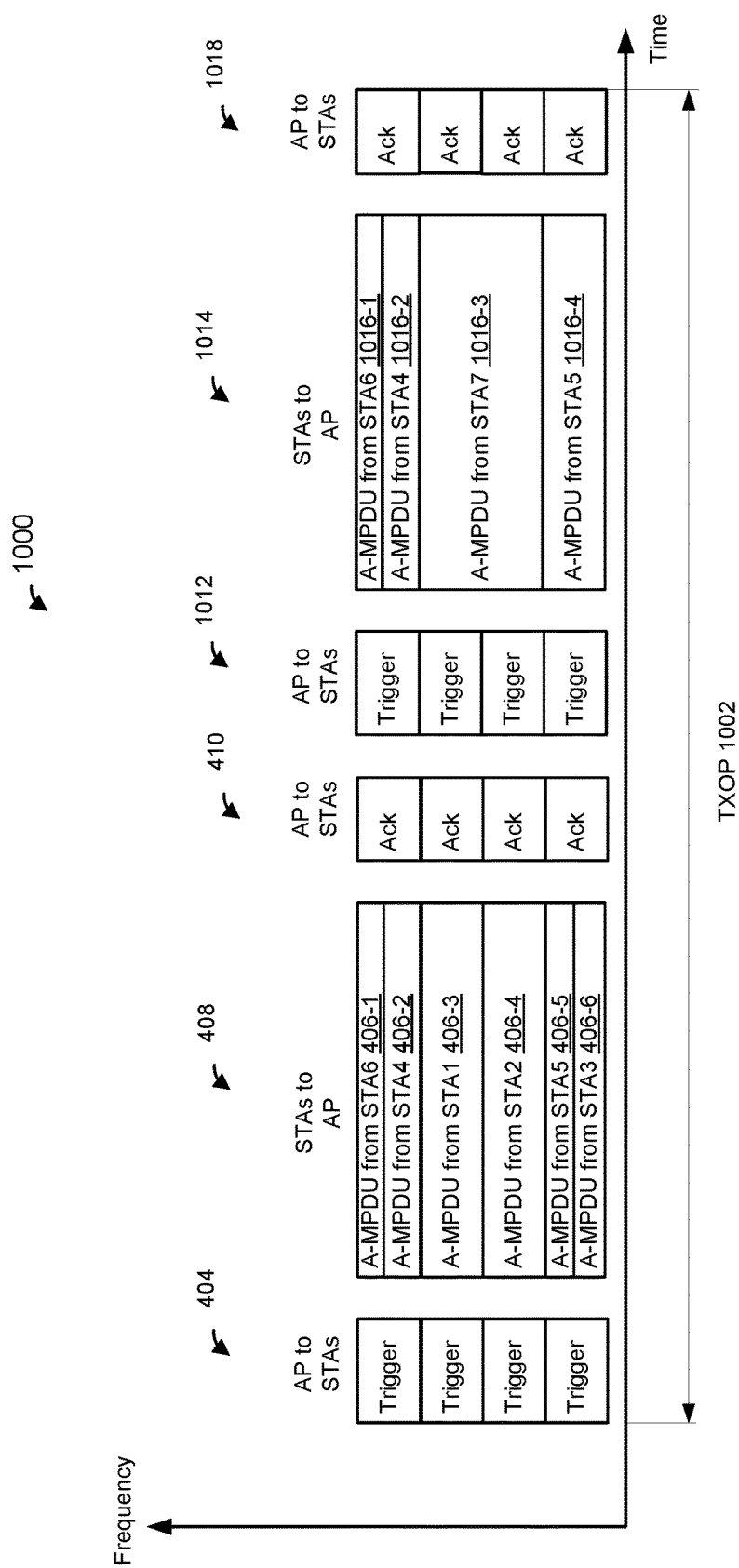
FIG. 10 is a diagram of another example transmission sequence in a WLAN, according to an embodiment.

FIG. 10 is a diagram of an example transmission sequence 1000 in a WLAN, such as the WLAN 10 of FIG. 1, according to another embodiment, in which an AP, such as the AP 14, triggers a UL OFDMA transmission by multiple client stations, such as multiple ones of the client stations 25, during a transmission opportunity period (TXOP) 1002. The transmission sequence 1000 is similar to the transmission sequence 400 of FIG. 4, except that the transmission sequence 1000 includes multiple triggered uplink transmissions by client stations 25 in the TXOP 1002, in an embodiment. Transmission of the acknowledgement frame 410 is followed by transmission, during a time t4, of a second trigger frame 1012. The second trigger frame 1012 triggers a second uplink OFDMA transmission 1014 by multiple client stations 25 to the AP 14. During a time t5, multiple client stations 25 triggered by the trigger frame 1014 transmit respective data units 1016 as parts of the OFDMA transmission 1014 to the AP 14, in an embodiment. During a time t6, the AP 14 transmits respective ACK frames 1018 to the multiple client stations 25 acknowledging receipt of the OFDM data units 1016 from the client stations 25. In another embodiment, the AP 14 transmits a broadcast acknowledgement frame that includes respective acknowledgements for the multiple client stations 25.

Although in the transmission sequence 1000, OFDMA transmissions are triggered by independently transmitted trigger frames 404, 1012, one or both of the trigger frames 404, 1012 are replaced with a downlink OFDMA data unit that combines downlink data and one or more rigger frames, in some embodiments. For example, one or both of the trigger frames 404, 1012 are replaced with a data unit such as the data unit 504 of FIG. 5, in some embodiments. Further, although the transmission sequence 1000 is illustrated in FIG. 10 as including only two triggered OFDMA transmissions 408, 1014 in the TXOP 1002, the transmission sequence 1000 includes other suitable numbers (e.g., 3, 4, 5, etc.) of triggered OFDMA transmissions, in some embodiments.

The trigger frame 1012 is generally similar to the trigger frame 404, in an embodiment. The trigger frame 1012 indicates respective subchannels allocated for uplink OFDMA transmissions by a group of client stations 25 that includes same and/or different client stations 25 as the group of client stations 25 triggered by the trigger frame 404, in various embodiments. The respective subchannels allocated for uplink OFDMA transmissions by the group of client stations 25 are the same as or different from subchannel allocations for transmission of the uplink transmission 408, in various embodiments. For example, in the embodiment of FIG. 10, while the trigger frame 404 indicates respective subchannels allocated to six client stations STA1 through STA6, the trigger frame 1012 indicates respective subchannels allocated to four client stations STA4, STA5, STA6, and STA7. Further, subchannels allocated to client stations STA4 and STA6 in the uplink OFDMA transmission 1014 are the same as the subchannels allocated to client stations STA4 and STA6 the uplink OFDMA transmission 408, in the illustrated embodiment. On the other hand, the subchannel allocated to STA 5 in the uplink OFDMA transmission 1014 is different from the subchannel allocated to client station STA5 in the uplink OFDMA transmission 408, in the illustrated embodiment.

In an embodiment, each client station 25 triggered by the trigger frame 404 utilizes a channel sensing technique 1002, such as one of the channel sensing techniques 602, 702, 802 described above, to determine whether client station 25 can transmit in the subchannel allocated to the client station 25. Subsequently, if the client station 25 is again triggered for uplink transmission by the trigger frame 1012, and if subchannel allocated to the client station 25 for uplink transmission triggered by the trigger frame 1012 is covered by the same channel or channels (e.g., same 20 MHz channel or channels) as the subchannel allocated to the client station 25 for uplink transmission triggered by the trigger frame 404, then the client station 25 does not conduct a channel sensing procedure for transmission of its data unit in the uplink transmission 1014. In another embodiment, the client station 25 does not conduct a channel sensing procedure only if the subchannel allocated to the client station 25 for uplink transmission triggered by the trigger frame 1012 is the same as the subchannel allocated to the client station 25 for uplink transmission triggered by the trigger frame 404. In such embodiments, the client station 25 relies on results of the channel sensing procedure 1002 to determine whether the client station 25 can transmit in the can transmit in the subchannel allocated to the client station 25. Alternatively, each client station 25 triggered by the trigger frame 1012 utilizes a channel sensing technique, such as one of the channel sensing techniques 602, 702, 802 described above, regardless of whether or not the client station 25 conducted a channel sensing procedure what it was previously triggered by the trigger frame 404.

Figure 11:
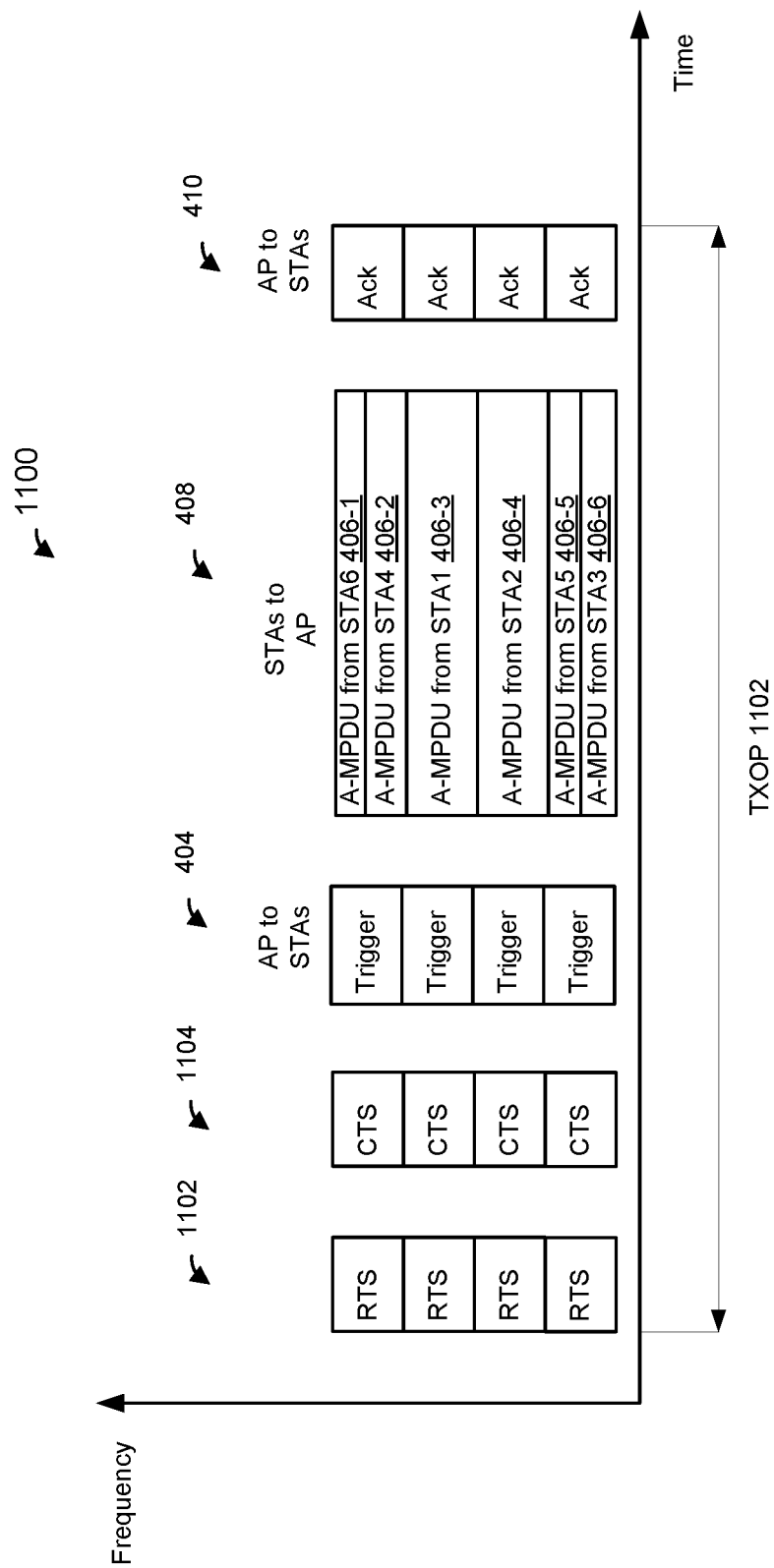
FIG. 11 is a diagram of another example transmission sequence in a WLAN, according to an embodiment.

FIG. 11 is a diagram of an example transmission sequence 1100 in a WLAN, such as the WLAN 10 of FIG. 1, according to another embodiment, in which an AP, such as the AP 14, triggers a UL OFDMA transmission by multiple client stations, such as multiple ones of the client stations 25, during a transmission opportunity period (TXOP) 1102. The transmission sequence 1100 is similar to the transmission sequence 400 of FIG. 4, except that the transmission sequence 1000 includes a request to send (RTS)/clear to send (CTS) frame exchange, or a MU-RTS/CTS frame exchange, which is sometimes referred to as "simultaneous RTS/CTS", with one or more client stations 25 prior to transmission of the trigger frame 404, in an embodiment. For example, the AP 14 transmits an RTS frame 1102 to a client station 25, and the client station 25 responds with a CTS frame 1104. Thus, the TXOP 1102 is protected by the RTS/CTS frame exchange, in an embodiment. Accordingly, the client stations 25 triggered by the trigger frame 404 are not required to perform additional channel sensing, in an embodiment. In an embodiment, the trigger frame 404 includes a channel sense indication of whether the client stations 25 should conduct a channel sensing procedure before responding to the trigger frame 404. The channel sense indication is set to indicate that the client stations 25 should not conduct channel sensing if a TXOP is protected by an RTS/CTS frame exchange, as is the case in the TXOP 1102, in an embodiment. In another embodiment, the trigger frame 404 includes a channel sense indication set to a value to indicate that client stations 25 should conduct channel sensing; but when the client station 25 has already sent a CTS frame, the client station 25 does not conduct the channel sensing procedure before responding to the trigger frame 404.

Figure 12:
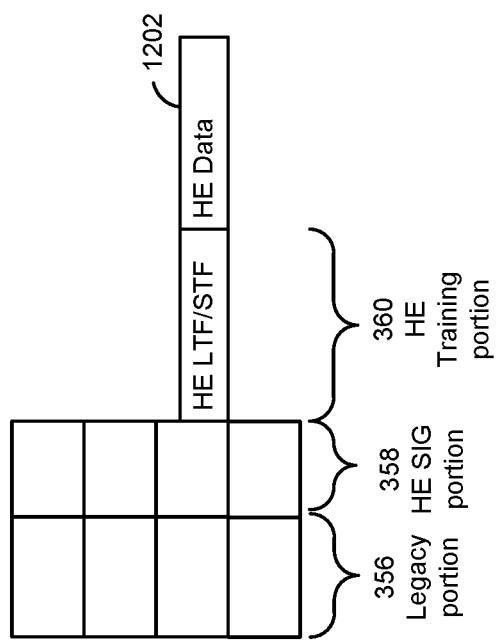
FIG. 12 is a block diagram of an example reduced PHY data unit, according to an embodiment.

As discussed above, when a client station 25 implements a channel sensing technique to determine whether the client station 25 can transmit in a subchannel allocated to the client station, such as one of the channel sensing techniques 602, 702, 802, the client stations 25 transmits its uplink data unit when the client station 25 determine that the subchannel allocated to the client station 25 or the channel or channels that include the subchannel allocated to the client station 25 is/are idle, in various embodiments. In some embodiments, if the client station 25 determines that the subchannel allocated to the client station 25 or the channel or channels that include the subchannel allocated to the client station 25 is/are busy, then the client station 25 refrains from transmission in the subchannel allocated to the client station 25. In another embodiment, if the client station 25 determines that the subchannel allocated to the client station 25 or the channel or channels that include the subchannel allocated to the client station 25 is/are busy, the client station 25 transmits a short data unit, such as non-data packet (NDP) or another suitable short data unit, in the subchannel allocated to the client station 25. FIG. 12 is a block diagram of an example short data unit 1200 transmitted by a client station 25 when the client station 25 determines that the subchannel allocated to the client station 25 or the channel or channels that include the subchannel allocated to the client station 25 is/are busy, according to an embodiment. The short data unit 1200 is the same as or similar to the data unit 370 of FIG. 3C. The short data unit 1200 includes a short data portion

1210, in an embodiment. The short data unit 1200 omits the short data portion 1210, in another embodiment. The short data unit 1200 is of a same or similar length (e.g., having same or similar transmission time) as a standard acknowledgement data unit that the client station 25 is configured to transmit to the AP 14, in an embodiment. The short data unit 12 is of another suitable length that is relatively shorter than a regular uplink data unit that the client station 25 is configured to transmit to the AP 14, in another embodiment.

In yet another embodiment, the client station 25 transmits a regular uplink data unit in the subchannel allocated to the client station 25 even if the client station that the subchannel allocated to the client station 25 or the channel or channels that include the subchannel allocated to the client station 25 is/are busy.

In some embodiments in which the 25 transmits an uplink data unit, such as a short uplink data unit or a regular uplink data unit, in the subchannel allocated to the client station 25 even if the client station that the subchannel allocated to the client station 25 or the channel or channels that include the subchannel allocated to the client station 25 is/are idle or busy, the client station 25 includes in the uplink data unit 25 a channel status report to report results of channel sensing to the AP 14. The AP 14 utilizes the channel status reports received from client stations 25 for scheduling and subchannel allocation for uplink triggering subsequent transmissions by the client station 25, in an embodiment.

Figure 13:
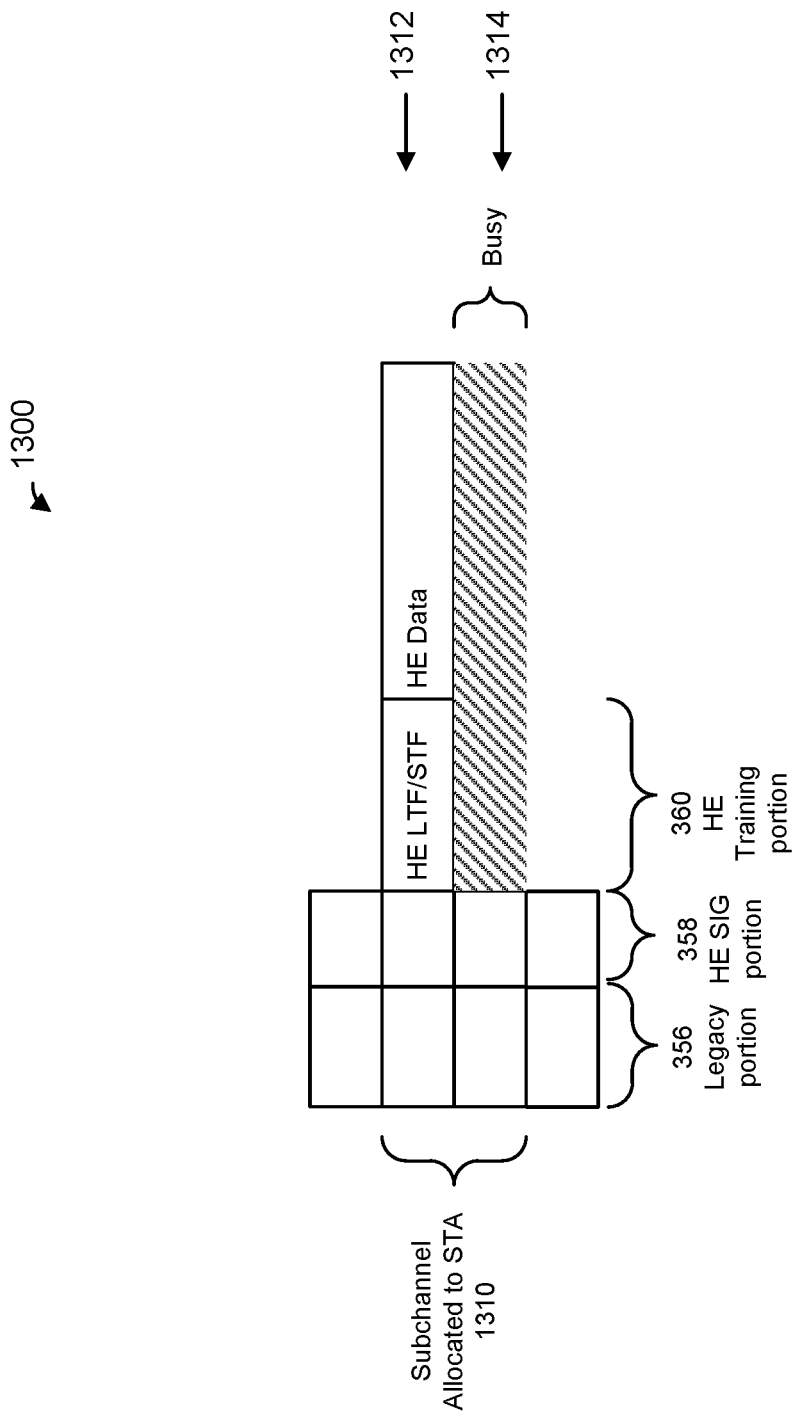
FIG. 13 is a block diagram of another example reduced PHY data unit, according to an embodiment.

In some scenarios, a client station 25 determines, using a channel sensing technique, such as one of the channel sensing techniques 602, 702, 802, implemented by the client station 25 that a subchannel allocated to the client station 25 is partially busy. FIG. 13 is a block diagram of an example partial data unit 1300 transmitted by a client station 25 when the client station 25 determines that the subchannel allocated to the client station 25 is partially busy, according to an embodiment. The data unit 1300 is generally similar to the data unit 370 of FIG. 3C. In the embodiment of FIG. 13, a 40 MHz subchannel 1310 is allocated to a client station 25, but the client station 25 determined that a first 20 MHz portion 1312 of the subchannel 1310 is idle and a second 20 MHz portion 1314 of the subchannel 1310 is busy. For example the second 20 MHz portion 1314 of the subchannel 1310 is being used by an OBSS, in an embodiment. The client station 25 transmits a data unit 1340 in the available portion 1312 of the subchannel 1310, in the illustrated embodiment. In another embodiment, the client station 25 transmits a uplink data unit, such as a regular data unit or a short data unit, that occupies the whole bandwidth of the subchannel allocated to the client station 25 even if the client station 25 determines that only a portion of the subchannel allocated to the client station 25 is idle. In some embodiments, the data unit In yet another embodiment, the client station 25 refrains from transmission in the allocated subchannel when the client station 25 determines that only a portion of the allocated subchannel is idle.

In some embodiments in which the 25 transmits an uplink data unit, such as a short uplink data unit or a regular uplink data unit, in an available portion of the subchannel allocated to the client station 25 when the client station 25 determines that that only a portion the subchannel allocated to the client station 25 is idle, or in the entire subchannel allocated to the client station 25 even if the client station that only a portion the subchannel allocated to the client station 25 is idle, the client station 25 includes in the uplink data unit 25 a channel status report to report results of channel sensing to the AP 14. The AP 14 utilizes the channel status reports received from client stations 25 for scheduling and subchannel allocation for uplink triggering subsequent transmissions by the client station 25, in an embodiment.

In an embodiment, client stations 25 are allowed to transmit a "reduced" data unit, such as the short data unit 1200 of FIG. 12 or the partial data unit 1300 of FIG. 13, only if the AP indicates to the client stations 25 that the AP 14 is capable of receiving such reduced data units. For example, in an embodiment, the AP 14 indicates its capability of receiving reduced data units in a management frame or a control frame transmitted by the AP 14 such as a beacon frame, an association response frame, a probe response frame, or another suitable management or control frame transmitted by the AP 14. In another embodiment, the AP 14 indicates its capability of receiving reduced data units in a trigger frame, such as the trigger frame 404 of FIG. 4 or the trigger frame included in the data unit 504 of FIG. 5, for example. Additionally, or alternatively, the AP 14 indicates to the client stations 25 whether or not the client stations 25 should transmit such reduced data units in case that a client station 25 detects that the subchannel allocated to the client station 25 or the channel or channels that include the subchannel allocated to the client station 25 is/are fully or partially busy. When such indications are included in a trigger frame, the respective indications are provided for each client station 25 being triggered by the trigger frame, or a common indication is provided for all client stations 25 being triggered by the trigger frame, in various embodiments.

In some embodiments, when the AP 14 receives a reduced data unit from a client station 25, such as the short data unit 1200 of FIG. 12 or the partial data unit 1300 of FIG. 13, the AP 14 determines, based on reception of the reduced data unit that the subchannel allocated to the client station 25 is at least partially busy. In some such embodiments, the AP 14 utilizes such channel state information determined based on reception of reduced data units from one or more client stations 25 for scheduling and subchannel allocation for subsequent uplink transmissions by the one or more client stations 25.

As discussed above with respect, for example, to FIGS. 4 and 5, the AP 14 transmits acknowledgement information (e.g., in respective acknowledgement frames transmitted to multiple client stations 25 or in a broadcast acknowledgment frame transmitted to multiple client stations 25) to acknowledge receipt of uplink OFDMA data units received from multiple client stations 25. In some embodiments, the AP 14 transmits a respective ACK frame, or includes acknowledgement information in a broadcast frame, only to those client stations 25 from which an uplink data unit was actually received by the AP 14. Referring, as just an example, to FIG. 4, in an embodiment, if the AP 14 does not receive an uplink data unit 406 from a client station 25, then the AP 14 transmits a negative acknowledgement (NAC) frame in place of an ACK frame 410 to the client station 25. In another embodiment, in which the AP 14 transmits a broadcast ACK frame to multiple client stations 25, if the AP 14 does not receive an uplink data unit 406 for a client station 25, then the AP 14 includes negative acknowledgement (NAC) information corresponding to the client station 25 in the broadcast ACK frame. In other embodiments, if the AP 14 does not receive an uplink data unit 406 from a client station 25, then the AP 14 does not transmit an ACK frame 410 to the client station 25, or does not include any acknowledgement information corresponding to the client station 25 in a broadcast ACK frame transmitted to multiple client stations 25. In some embodiments, if the AP 14 does not receive an uplink data unit 406 from a client station 25, then the AP 14 subsequently triggers the client station 25 to transmit an uplink OFDMA data unit to the AP 14. The AP 14 subsequently triggers the client station 25 to transmit the uplink OFDMA data unit in a same subchannel that was allocated to the client station 25 for transmission in the uplink transmission 408, or in a different subchannel, depending on the embodiment and/or scenario.

In an embodiment, when the AP 14 receives a reduced data unit, such as the short data unit 1200 of FIG. 12 or the partial data unit 1300 of FIG. 13, from a client station 25, the AP 14 acknowledges receipt of the reduced data unit by transmitting acknowledgement information, for example in an acknowledgement frame transmitted to the client station 25 or in a broadcast acknowledgement frame transmitted to multiple client stations 25. In another embodiment, when the AP 14 receives a reduced data unit from a client station 25, the AP 14 does not transmit acknowledgement information to the client station 25.

In an embodiment, if a client station 25 does not receive an acknowledgement, or receives a negative acknowledgement, from the AP 14 in response to transmission of an uplink OFDMA data unit to the AP 14, the client station 25 awaits to be subsequently triggered for uplink OFDMA transmission to the AP 14. Additionally or alternatively, the client station 25 contends for the communication channel between the client station 25 and the AP 14. For example, the client station 25 implements an OFDMA random access technique to gain access to the communication channel, or implements a CSMA/CS channel access technique to gain access to the communication channel, in some embodiments. If the client station 25 gains access to the communication channel, the client station 25 re-transmits the data unit that was not acknowledged, or was negatively acknowledged, by the AP 14.

Figure 14:
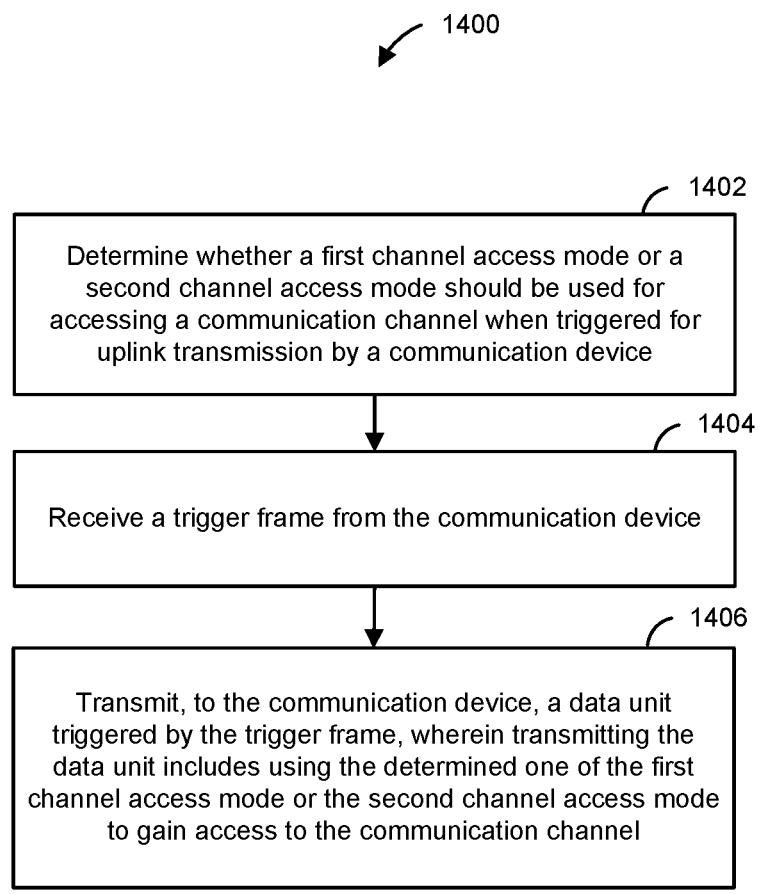
FIG. 14 is a flow diagram of an example method for communicating in a wireless communication network, according to an embodiment.

FIG. 14 is a flow diagram of an example method 1400 for communicating in a communication channel of a wireless communication network, according to an embodiment. With reference to FIG. 1, the method 1400 is implemented by the network interface device 27, in an embodiment. For example, in one such embodiment, the PHY processing unit 29 is configured to implement at least a portion of the method 1400. According to another embodiment, the MAC processing 28 is also configured to implement at least a portion of the method 1400. In other embodiments, the method 1400 is implemented by other suitable network interface devices.

At block 1402, it is determined whether a first channel access mode or a second channel access mode should be used for accessing the communication channel when triggered for uplink transmission by a communication device. In an embodiment, the first channel access mode is the non-sensing channel access mode described above. In another embodiment, the first channel sensing mode is a suitable channel sensing mode different from the non-sensing channel access mode described above. In an embodiment, the second channel access mode is the sensing channel access mode described above. In another embodiment, the second channel sensing mode is a suitable channel sensing mode different from the sensing channel access mode described above. In an embodiment, it is determined, at block 1402, whether the first channel access mode or the second channel access mode should be used based on an indication received from the communication device. In another embodiment, it is determined, at block 1402, whether the first channel access mode or the second channel access mode should be used without input from the communication device.

At block 1404, a trigger frame is received from the communication device. In an embodiment, the trigger frame 404 of FIG. 4 is received. In another embodiment, a trigger frame included in the data unit 504 of FIG. 5 is received. In other embodiments, other suitable trigger frames are received.

At block 1406, a data unit triggered by the trigger frame received at block 1404 is transmitted. In an embodiment, the data unit 370 of FIG. 3C is transmitted. In another embodiment, another suitable data unit is transmitted. Transmitting the data unit includes using the one of the first channel access mode or the second channel access mode determined at block 1404 is used to gain access to the communication channel. In an embodiment, using the first channel access mode to gain access to the communication channel comprises accessing the communication channel without relying on channel sensing. On the other hand, in an embodiment, using the second channel access mode to gain access to the communication channel includes determining, using a channel sensing technique, whether the communication channel is available for transmission, and gaining access to the communication channel only if it is determined that the communication channel is available for transmission. In an embodiment, the channel access technique is the channel sensing technique 602 of FIG. 6. In another embodiment, the channel access technique is the channel sensing technique 702 of FIG. 7 or the channel sensing technique 802 of FIG. 8. In an embodiment, using the channel sensing technique includes selecting the channel sensing technique from among a first channel sensing technique (e.g., the channel sensing technique sensing technique 602 of FIG. 6 or similar) and a second channel sensing technique (the channel sensing technique 702 of FIG. 7 or the channel sensing technique 802 of FIG. 8 or similar). In other embodiments, other suitable channel sensing techniques are used.

In an embodiment, a method for communicating in a communication channel of a wireless communication network includes: determining, at a first communication device, whether the first communication device is to use a first channel access mode or a second channel access mode for accessing the communication channel when the first communication device is triggered for uplink transmission by a second communication device; receiving, at the first communication device from the second communication device, a trigger frame; and transmitting, from the first communication device to the second communication device, a data unit triggered by the trigger frame, wherein transmitting the data unit includes using the determined one of the first channel access mode or the second channel access mode to gain access to the communication channel.

In various other embodiments, the method includes one of, or any suitable combination of two or more of, the following features.

Determining whether the first communication device is to use the first channel access mode or the second channel access mode includes receiving, at the first communication device from the second communication device, an indication that indicates whether the first channel access mode or the second channel access mode should be used by the first communication device.

Receiving the indication comprises receiving the indication included in the trigger frame.

Receiving the indication comprises receiving the indication included in a management frame transmitted by the second communication device.

Transmitting the data unit using the first channel access mode comprises transmitting the data unit without relying on channel sensing performed by the first communication device; and transmitting the data unit using the second channel access mode comprises: determining, using a channel sensing technique, whether at least a portion of the communication channel is available for transmission by the first communication device, and transmitting the data unit only if it is determined, based on the channel sensing technique, that at least the portion of the communication channel is available for transmission by the first communication device.

Determining, using the channel sensing technique, whether at least the portion of the communication channel is available for transmission by the first communication device comprises: sensing the communication channel before receiving the trigger frame, generating a channel sensing report based on sensing of the communication channel before receiving the trigger frame, and after receiving the trigger frame, determining, based on the channel sensing report, whether at least the portion of the communication channel is available for transmission by the first communication device.

Generating the channel sensing report includes generating respective indications for each of a plurality of channels of the wireless communication network, wherein each indication indicates whether a particular channel of the wireless communication network is busy or idle; and the method further comprises: determining, based on the trigger frame, a subchannel allocated for transmission by the first communication device, and determining that at least the portion of the communication channel is available for transmission by the first communication device if a channel, of the plurality of channels, that includes the subchannel allocated for transmission by the first communication device is idle.

Determining, using the channel sensing technique, whether at least the portion of the communication channel is available for transmission by the first communication device comprises: sensing the communication channel after receiving the trigger frame, and determining, based on sensing the communication channel after receiving the trigger frame, whether at least the portion of the communication channel is available for transmission by the first communication device.

The method further comprises: determining, based on the trigger frame, a subchannel allocated for transmission by the first communication device, determining, based on sensing the communication channel after receiving the trigger frame, whether a channel, of a plurality of channels of the wireless communication network, that includes the subchannel allocated for transmission by the first communication device is busy or idle, and determining that at least the portion of the communication channel is available for transmission by the first communication device if the channel that includes the subchannel allocated for transmission by the first communication device is idle.

Determining, using the channel sensing technique, whether at least the portion of the communication channel is available for transmission by the first communication device includes selecting the channel sensing from among a first channel sensing technique and a second channel sensing technique, wherein (i) the first channel sensing technique includes sensing the communication channel before receiving the trigger frame and (ii) the second channel sensing technique includes sensing the communication channel after receiving the trigger frame.

Transmitting the data unit using the second channel access mode comprises: determining, using a channel sensing technique, whether each of one or more 20 MHz channels corresponding to an allocated subchannel is available for transmission by the first communication device; and transmitting the data unit only if it is determined, based on the channel sensing technique, that all of the one or more 20 MHz channels corresponding to the allocated subchannel are available for transmission by the first communication device.

In another embodiment, a first communication device comprises a network interface device having one or more integrated circuits. The one or more integrated circuits are configured to: determine whether the first communication device is to use a first channel access mode or a second channel access mode for accessing the communication channel when the first communication device is triggered for uplink transmission by a second communication device, receive a trigger frame from the second communication device, and transmit, to the second communication device, a data unit triggered by the trigger frame, wherein transmitting the data unit includes using the determined one of the first channel access mode or the second channel access mode to gain access to the communication channel.

In various other embodiments, the first communication device includes one of, or any suitable combination of two or more of, the following features.

The one or more integrate circuits are further configured to: receive, from the second communication device, an indication that indicates whether the first communication device is to use the first channel access mode or the second channel access mode, and determine whether the first communication device is to use the first channel access mode or the second channel access mode based on the indication received from the second communication device.

The indication is included in the trigger frame received from the second communication device.

The indication is included in a management frame transmitted by the second communication device.

The one or more integrated circuits are configured to: when transmitting the data unit using the first channel access mode, transmit the data unit without relying on channel sensing performed by the first communication device; and when transmitting the data unit using the second channel access mode: determine, using a channel sensing technique, whether at least a portion of the communication channel is available for transmission by the first communication device, and transmit the data unit only if it is determined, based on the channel sensing technique, that at least the portion communication channel is available for transmission by the first communication device.

The one or more integrated circuits are configured to: sense the communication channel before receiving the trigger frame, generate a channel sensing report based on sensing of the communication channel before receiving the trigger frame, and after receiving the trigger frame, determine, based on the channel sensing report, whether at least the portion of the communication channel is available for transmission by the first communication device.

The one or more integrated circuits are configured to: generate the channel sensing report to include respective indications for each of a plurality of channels of the wireless communication network, wherein each indication indicates whether a particular channel of the wireless communication network is busy or idle, determine, based on the trigger frame, a subchannel allocated for transmission by the first communication device, and determine that at least the portion of the communication channel is available for transmission by the first communication device if a channel, of the plurality of channels, that includes the subchannel allocated for transmission by the first communication device is idle.

The one or more integrated circuits are configured to: sense the communication channel after receiving the trigger frame, and determine whether at least the portion of the communication channel is available for transmission by the first communication device based on sensing the communication channel after receiving the trigger frame.

The one or more integrated circuits are further configured to: determine, based on the trigger frame, a subchannel allocated for transmission by the first communication device, determine, based on sensing the communication channel after receiving the trigger frame, whether a channel, of a plurality of channels of the wireless communication network, that includes the subchannel allocated for transmission by the first communication device is busy or idle, and determine that at least the portion of the communication channel is available for transmission by the first communication device if the channel that includes the subchannel allocated for transmission by the first communication device is idle.

The one or more integrated circuits are further configured to, when transmitting the data unit using the second channel access mode, select the channel sensing from among a first channel sensing technique and a second channel sensing technique, wherein (i) the first channel sensing technique includes sensing the communication channel before receiving the trigger frame and (ii) the second channel sensing technique includes sensing the communication channel after receiving the trigger frame.

The one or more integrated circuits are configured to, when transmitting the data unit using the second channel access mode: determine, using a channel sensing technique, whether each of one or more 20 MHz channels corresponding to an allocated subchannel is available for transmission by the first communication device, and transmit the data unit only if it is determined, based on the channel sensing technique, that all of the one or more 20 MHz channels corresponding to the allocated subchannel are available for transmission by the first communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

What is claimed is:

1. A method for communicating in a communication channel of a wireless communication network, the method comprising:
   determining, at a first communication device, whether the first communication device is to use a first channel access mode or a second channel access mode for accessing the communication channel when the first communication device is triggered, by a second communication device, for uplink transmission to the second communication device;
   receiving, at the first communication device from the second communication device, a trigger frame via the communication channel; and
   transmitting, from the first communication device to the second communication device, a data unit triggered by the trigger frame, wherein transmitting the data unit includes using the determined one of the first channel access mode or the second channel access mode to gain access to the communication channel, wherein (i) transmitting the data unit using the first channel access mode comprises transmitting the data unit without relying on channel sensing performed by the first communication device, and (ii) transmitting the data unit using the second channel access mode comprises:
      determining, using a channel sensing technique, whether at least a portion of the communication channel is available for transmission by the first communication device, wherein determining, using the channel sensing technique, includes (i) sensing the communication channel before receiving the trigger frame, (ii) generating a channel sensing report based on sensing of the communication channel before receiving the trigger frame, and (iii) after receiving the trigger frame, determining, based on the channel sensing report, whether at least the portion of the communication channel is available for transmission by the first communication device, and
      transmitting the data unit only if it is determined, based on the channel sensing technique, that at least the portion of the communication channel is available for transmission by the first communication device.

2. The method of claim 1, wherein determining whether the first communication device is to use the first channel access mode or the second channel access mode includes receiving, at the first communication device from the second communication device, an indication that indicates whether the first channel access mode or the second channel access mode should be used by the first communication device.

3. The method of claim 2, wherein receiving the indication comprises receiving the indication included in the trigger frame.

4. The method of claim 2, wherein receiving the indication comprises receiving the indication included in a management frame transmitted by the second communication device.

5. The method of claim 2, wherein receiving the indication comprises receiving the indication included in a beacon frame transmitted by the second communication device.

6. The method of claim 1, wherein using the channel sensing technique includes using a clear channel assessment (CCA) procedure.

7. The method of claim 1, wherein:
   generating the channel sensing report includes generating respective indications for each of a plurality of frequency bands within the communication channel, wherein each indication indicates whether a particular frequency band within the communication channel is busy or idle; and
   the method further comprises:
      determining, based on the trigger frame, a subchannel allocated for transmission by the first communication device, and determining that at least the portion of the communication channel is available for transmission by the first communication device if a frequency band, of the plurality of frequency bands, that includes the subchannel allocated for transmission by the first communication device is idle.

8. A method for communicating in a communication channel of a wireless communication network, the method comprising:
  determining, at a first communication device, whether the first communication device is to use a first channel access mode or a second channel access mode for accessing the communication channel when the first communication device is triggered, by a second communication device, for uplink transmission to the second communication device;
  receiving, at the first communication device from the second communication device, a trigger frame via the communication channel; and
  determining, based on the trigger frame, a subchannel allocated for transmission by the first communication device;
  transmitting, from the first communication device to the second communication device, a data unit triggered by the trigger frame, wherein transmitting the data unit includes using the determined one of the first channel access mode or the second channel access mode to gain access to the communication channel;
  wherein transmitting the data unit using the first channel access mode comprises transmitting the data unit without relying on channel sensing performed by the first communication device; and
  wherein transmitting the data unit using the second channel access mode comprises:
    determining, using a channel sensing technique, whether at least a portion of the communication channel is available for transmission by the first communication device, and
    transmitting the data unit only if it is determined, based on the channel sensing technique, that at least the portion of the communication channel is available for transmission by the first communication device;
  wherein determining, using the channel sensing technique, whether at least the portion of the communication channel is available for transmission by the first communication device comprises:
    sensing the communication channel after receiving the trigger frame,
    determining, based on sensing the communication channel after receiving the trigger frame, whether a frequency band, of a plurality of frequency bands of the communication channel, that includes the subchannel allocated for transmission by the first communication device is busy or idle, and
    determining that at least the portion of the communication channel is available for transmission by the first communication device if the frequency band that includes the subchannel allocated for transmission by the first communication device is idle.

9. The method of claim 1, wherein determining, using the channel sensing technique, whether at least the portion of the communication channel is available for transmission by the first communication device includes selecting the channel sensing from among a first channel sensing technique and a second channel sensing technique, wherein (i) the first channel sensing technique includes sensing the communication channel before receiving the trigger frame and (ii) the second channel sensing technique includes sensing the communication channel after receiving the trigger frame.

10. The method of claim 1, wherein transmitting the data unit using the second channel access mode comprises:
  determining, using the channel sensing technique, whether each of one or more 20 MHz frequency bands, within the communication channel, corresponding to an allocated subchannel is available for transmission by the first communication device; and
  transmitting the data unit only if it is determined, based on the channel sensing technique, that all of the one or more 20 MHz frequency bands corresponding to the allocated subchannel are available for transmission by the first communication device.

11. A first communication device, comprising:
  a network interface device having one or more integrated circuits configured to:
    determine whether the first communication device is to use a first channel access mode or a second channel access mode for accessing a communication channel when the first communication device is triggered, by a second communication device, for uplink transmission to the second communication device,
    receive a trigger frame from the second communication device via the communication channel, and
    transmit, to the second communication device, a data unit triggered by the trigger frame, wherein transmitting the data unit includes using the determined one of the first channel access mode or the second channel access mode to gain access to the communication channel, wherein (i) transmitting the data unit using the first channel access mode comprises transmitting the data unit without relying on channel sensing performed by the first communication device, and (ii) transmitting the data unit using the second channel access mode comprises:
      determining, using a channel sensing technique, whether at least a portion of the communication channel is available for transmission by the first communication device, wherein determining, using the channel sensing technique, includes (i) sensing the communication channel before receiving the trigger frame, (ii) generating a channel sensing report based on sensing of the communication channel before receiving the trigger frame, and (iii) after receiving the trigger frame, determining, based on the channel sensing report, whether at least the portion of the communication channel is available for transmission by the first communication device, and
      transmitting the data unit only if it is determined, based on the channel sensing technique, that at least the portion of the communication channel is available for transmission by the first communication device.

12. The first communication device of claim 11, wherein the one or more integrate circuits are further configured to:
  receive, from the second communication device, an indication that indicates whether the first communication device is to use the first channel access mode or the second channel access mode; and
  determine whether the first communication device is to use the first channel access mode or the second channel access mode based on the indication received from the second communication device.

13. The first communication device of claim 12, wherein the indication is included in the trigger frame received from the second communication device.

14. The first communication device of claim 12, wherein the indication is included in a management frame transmitted by the second communication device.

15. The first communication device of claim 12, wherein the indication is included in a beacon frame transmitted by the second communication device.

16. The first communication device of claim 11, wherein using the channel sensing technique includes using a clear channel assessment (CCA) procedure.

17. The first communication device of claim 11, wherein the one or more integrated circuits are configured to:
generate the channel sensing report to include respective indications for each of a plurality of frequency bands within the communication channel, wherein each indication indicates whether a particular frequency band within the communication channel is busy or idle;
determine, based on the trigger frame, a subchannel allocated for transmission by the first communication device; and
determine that at least the portion of the communication channel is available for transmission by the first communication device if a frequency band, of the plurality of frequency bands, that includes the subchannel allocated for transmission by the first communication device is idle.

18. A first communication device, comprising:
a network interface device having one or more integrated circuits configured to:
determine whether the first communication device is to use a first channel access mode or a second channel access mode for accessing a communication channel when the first communication device is triggered, by a second communication device, for uplink transmission to the second communication device,
receive a trigger frame from the second communication device via the communication channel,
determine, based on the trigger frame, a subchannel allocated for transmission by the first communication device,
transmit, to the second communication device, a data unit triggered by the trigger frame, wherein transmitting the data unit includes using the determined one of the first channel access mode or the second channel access mode to gain access to the communication channel,
when transmitting the data unit using the first channel access mode, transmit the data unit without relying on channel sensing performed by the first communication device, and
when transmitting the data unit using the second channel access mode:
determine, using a channel sensing technique, whether at least a portion of the communication channel is available for transmission by the first communication device, and
transmit the data unit only if it is determined, based on the channel sensing technique, that at least the portion communication channel is available for transmission by the first communication device;
wherein the one or more integrated circuits are further configured to, as part of determining, using the channel sensing technique, whether at least the portion of the communication channel is available for transmission by the first communication device:
sense the communication channel after receiving the trigger frame,
determine, based on sensing the communication channel after receiving the trigger frame, whether a frequency band, of a plurality of frequency bands within the communication channel, that includes the subchannel allocated for transmission by the first communication device is busy or idle, and
determine that at least the portion of the communication channel is available for transmission by the first communication device if the frequency band that includes the subchannel allocated for transmission by the first communication device is idle.

19. The first communication device of claim 11, wherein the one or more integrated circuits are further configured to, when transmitting the data unit using the second channel access mode, select the channel sensing from among a first channel sensing technique and a second channel sensing technique, wherein (i) the first channel sensing technique includes sensing the communication channel before receiving the trigger frame and (ii) the second channel sensing technique includes sensing the communication channel after receiving the trigger frame.

20. The first communication device of claim 11, wherein the one or more integrated circuits are configured to, when transmitting the data unit using the second channel access mode:
determine, using the channel sensing technique, whether each of one or more 20 MHz frequency bands, within the communication channel, corresponding to an allocated subchannel is available for transmission by the first communication device; and
transmit the data unit only if it is determined, based on the channel sensing technique, that all of the one or more 20 MHz frequency bands corresponding to the allocated subchannel are available for transmission by the first communication device.

\* \* \* \* \*